MAXIMUM CUTTING SPEED

HYSTERESIS LOOPS

3,783,041
METHOD OF PRODUCING SEMI-HARD MAGNETIC MATERIALS WITH A PLURALITY OF HEATING AND COOLING STEPS

Tadao Tokushima, Hamamatsu, Japan, assignor to Nippon Gakki Seizo Kabushiki Kaisha, Hamamatsu-shi, Shizuoka-ken, Japan
Continuation of abandoned application Ser. No. 845,140, July 28, 1969. This application Mar. 7, 1972, Ser. No. 232,453
Claims priority, application Japan, July 31, 1968, 43/53,644; Aug. 27, 1968, 43/61,347, 43/61,348
Int. Cl. C22b *19/00*
U.S. Cl. 148—121                                        12 Claims

---

ABSTRACT OF THE DISCLOSURE

A method of producing cheap, mass-producible, and machine workable semi-hard magnetic materials having good magnetic properties merely by casting and heat-treating without cold working, which comprises, after a solution treatment, a plurality of repetitive steps of heating and cooling an alloy containing a plurality of kinds of and required quantities of inexpensive components at temperatures below the Curie temperature, each of the heating temperatures in said steps being higher than the heating temperature of the preceding step. The main contents of the alloy are Fe, Mn, Cu and Ti.

---

This application is a continuation-in-part of application Ser. No. 845,140 filed July 28, 1969, and now abandoned.

BACKGROUND OF THE INVENTION

This invention relates to a method of producing semi-hard magnetic materials consisting essentially of Fe, Mn, Cu, and Ti.

More particularly, this invention relates to a method of producing semi-hard magnetic materials having good magnetic properties merely by casting and heat-treating, cold working not being necessary, from inexpensive raw materials.

As semi-hard magnetic materials, Fe-V-Co alloys, such as "Vicalloy," and Fe-Co-Ni-Al alloys, such as "Alnico" etc. have been used.

However, these alloys are very expensive because comparatively expensive components, such as Co, V, and Ni are used as main ingredients thereof. Moreover, the former alloys require refined cold working techniques for obtaining good magnetic properties because of their great hardness, and the latter alloys are disadvantageous in that machine working thereof, such as cutting by a lathe is almost impossible.

Fe-Mn alloys are known as magnetic materials not containing expensive components such as Co, Ni, etc., and it is also known that comparatively good magnetic properties thereof can be obtained by subjecting them to specific working (Jellinghaus, 1941).

However, these alloys have a disadvantage in that intense cold working thereof must be carried out to obtain the desired magnetic properties, and have not reached a state of development whereby they can be practically substituted for the aforementioned expensive alloys.

It is also known that with a two-component alloy of Fe and Mn containing 1 to 14% of Mn, the coercive force thereof is increased by quenching.

Such an alloy, however, cannot be used as a magnetic material because the magnetic property thereof is very poor. Recently, tests have been carried out in Japan on the improvement of magnetic properties afforded by the addition of Cu and Ti to Fe-Mn alloys. However, this improvement is not practical because a high degree of cold working (more than 80%) is required, and more than 80% cold working of such alloys into ring shape, for example, for hysteresis motor materials is difficult. Moreover, good magnetic properties cannot be obtained.

As a conclusion, all semi-hard magnetic materials used in the past except Alnico alloy require cold working to obtain desired magnetic properties, and the Alnico alloy requires very difficult machining. Accordingly commercial use of these two kinds of alloys is not feasible.

SUMMARY OF THE INVENTION

It is an object of the invention to provide a method of producing low-price, mass-producible, semi-hard magnetic materials having excellent magnetic properties which are not accompanied by the above described drawbacks of known magnetic materials.

According to the present invention in one embodiment thereof, briefly summarized, there is provided a method of producing semi-hard magnetic materials comprising a plurality of repetitive steps of heating and cooling an alloy consisting essentially of 5% to 15% of Mn, (throughout this disclosure, all percentages are by weight unless otherwise specified) 0.2% to 5% of Cu, 0.4% to 7% of Ti, and a remainder of iron, at temperatures below the Curie temperature, each of the heating temperatures in these steps being higher than the heating temperature of the preceding step.

According to the present invention in another embodiment thereof, there is provided a method of producing semi-hard magnetic materials which comprises a plurality of repetitive steps of heating and cooling an alloy consisting essentially of 5% to 15% of Mn, 0.2% to 5% of Cu, and 0.4% to 7% of Ti, and at least one of 0.1% to 8% of Cr, 0.1% to 50% of Co, 0.1% to 3% of Ni, 0.1% to 6% of V, and a remainder of iron at temperatures below the Curie temperature, each of the heating temperature in these steps being higher than the heating temperature of the preceding step.

According to the present invention in still another embodiment thereof, there is provided a method of producing semi-hard magnetic materials which comprises a plurality of repetitive steps of heating and cooling an alloy consisting essentially of 5% to 15% of Mn, 0.2% to 5% of Cu, and 0.4% to 7% of Ti, and at least one of 0.1% to 2.5% of Si, 0.1% to 3% of Ge, 0.1% to 2.0% of Sn, Zr, Nb, B, Te, W, S, Pb, Mo, Al, P, and a remainder of iron, at temperatures below the Curie temperature, each of the heating temperatures in these steps being higher than the heating temperature of the preceding step.

According to the present invention in a further embodiment thereof, there is provided a method of producing semi-hard magnetic materials, which comprises a plurality of repetitive steps of heating and cooling an alloy consisting essentially of 5% to 15% of Mn, 0.2% to 5% of Cu and 0.4% to 7% of Ti, at least one of 0.1% to 8% of Cr, 0.1% to 50% of Co, 0.1% to 3% of Ni, and 0.1% to 6% of V, and at least one of 0.1% to 2.5% of Si, 0.1% to 3% of Ge, 0.1% to 2% of Sn, Zr, Nb, B, Te, W, S, Pb, Mo, Al, P, and a remainder of iron, at temperatures below the Curie temperature, each of the heating temperatures in these steps being higher than the heating temperature of the preceding step.

According to the present invention in a still further embodiment thereof, there is provided a method of producing semi-hard magnetic materials, which comprises a plurality of repetitive steps of heating and cooling an alloy consisting essentially of 5% to 15% of Mn, 0.2% to 5% of Cu, and 0.4% to 7% of Ti, and at least one of 3d transition metals having 3 to 12 Argon outer shell electrons on the average, at temperatures below the Curie temperature, each of the heating temperatures below the Curie temperature, each of the heating temperatures in these steps being higher than the heating temperature of the preceding step.

According to the present invention in an additional aspect thereof, there is provided a method of producing semi-hard magnetic materials, which comprises a plurality of repetitive steps of heating and cooling an alloy consisting essentially of 5% to 15% of Mn, 0.2% to 5% of Cu, and 0.4% to 7% of Ti, at least one of 3d transition metals having 3 to 12 Argon outer shell electrons on the average, and at least one of 0.1% to 2.5% of Si, 0.1% to 3.0% of Ge, 0.1% to 2.0% of Sn, Zr, Nb, B, Te, W, S, Pb, Mo, Al, P, and a remainder of iron, at temperatures below the Curie temperature, each of the heating temperatures in these steps being higher than the heating temperature of the preceding step.

DETAILED DESCRIPTION OF THE INVENTION

Figure 1:
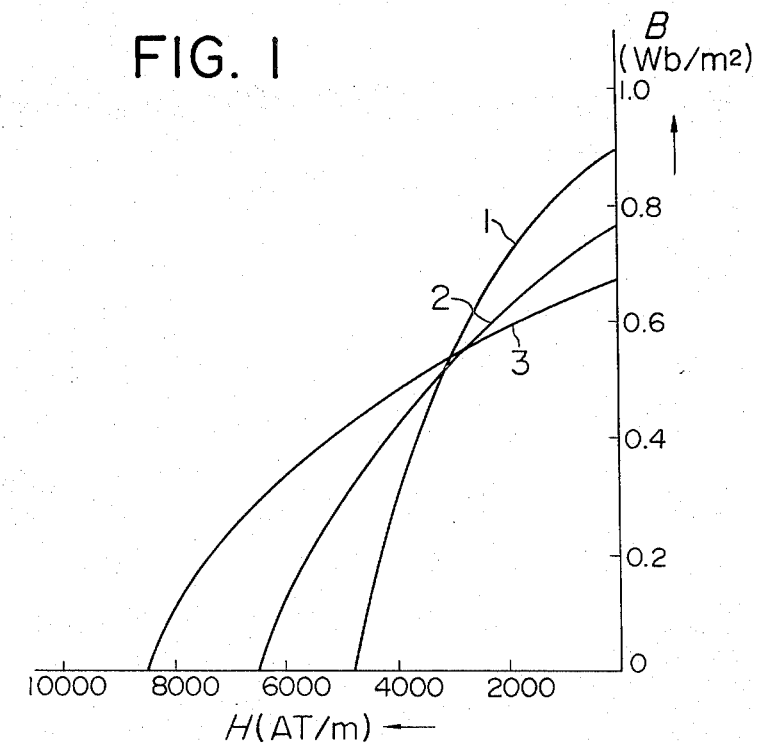
FIGS. 1 through 20, inclusive, 23, 24, 27, 28, 29, 32, 33(a), 35, 36, 37, 39, 40 and 41 are graphical representations indicating magnetic characteristics of alloys produced in accordance with the invention.

The present invention in its several embodiments are enumerated hereinabove will now be described in detail with respect to the following examples.

The first embodiment of the invention: Examples 1, 2, 3, 10, 12, 33, 38, 39, 54, 55, 56 and 57.

The second embodiment of the invention: Examples 4 to 7, 11, 23 to 26, 28 to 31, 40, 42, 43 and 44.

The third embodiment of the invention: Examples 8, 9, 13, 14, 15, 16, 18, 32, 34, 37.

The fourth embodiment of the invention: Examples 17, 19 to 22, 27, 35, 36, 41 and 45.

The fifth embodiment of the invention: Examples 47 to 49.

Examples 50 and 51 are described as reference examples.

All values of the elements in the tables of the examples are indicated in percentages by weight, and the values of Mn, Cu, Ti, Cr, Co, Ni, V, Ge, and Si are indicated by analysis values thereof and the values of the other elements indicated by adding quantities. Methods of determining the values are as follows:

Mn — Volumetric method (JIS, G 1213)
Cu — Volumetric method
Ti — Photometric (colorimetric) method
Co, Ni, Cr, V — Volumetric method
Si — Gravimetric method (JIS, G 1212)

The following table shows the examples in detail, components being shown omitting balance quantities of iron.

Referring to the table, e.g., Example No. 1 is a method in which an alloy consisting of 12% of Mn, 1% of Cu, 3% of Ti and a balance of iron with inevitable impurities is subjected to a solution treatment heating at 1100° C. for 2 hours followed by quenching to a temperature of 20–30° C. and then to the heat treatment of two steps of heating, the first step being at 400° C. for 5 hours and a second step being at 550° C. for 1 hour. Other examples are to be comprehended likewise.

TABLE

| Example number | Component Element | Quantity, weight percent | Solution treatment Temp., °C. | Time, hrs. | Heat-treatment Temp., °C. | Time, hrs. |
|---|---|---|---|---|---|---|
| 1 | Mn | 12.00 | 1,100 | 2 | 400 | 5 |
|   | Cu | 1.00 |   |   | 550 | 1 |
|   | Ti | 3.00 |   |   |   |   |
| 2 | Mn | 12.50 | 1,100 | 2 | 400 | 5 |
|   | Cu | 1.00 |   |   | 550 | 1 |
|   | Ti | 3.00 |   |   |   |   |
| 3 | Mn | 13.00 | 1,100 | 2 | 400 | 5 |
|   | Cu | 1.00 |   |   | 550 | 1 |
|   | Ti | 3.00 |   |   |   |   |
| 4 | Mn | 14.03 | 1,150 | 2 | 400 | 7 |
|   | Cu | 3.08 |   |   | 550 | 0.5 |
|   | Ti | 2.62 |   |   |   |   |
|   | Cr | 2.17 |   |   |   |   |
| 5 | Mn | 13.77 | 1,150 | 2 | 400 | 7 |
|   | Cu | 3.04 |   |   | 550 | 0.5 |
|   | Ti | 2.60 |   |   |   |   |
|   | Cr | 4.08 |   |   |   |   |
| 6 | Mn | 11.22 | 1,150 | 2 | 400 | 7 |
|   | Cu | 3.25 |   |   | 550 | 0.5 |
|   | Ti | 2.24 |   |   |   |   |
|   | Cr | 3.89 |   |   |   |   |
| 7 | Mn | 9.26 | 1,150 | 2 | 400 | 7 |
|   | Cu | 3.02 |   |   | 550 | 0.5 |
|   | Ti | 2.78 |   |   |   |   |
|   | Cr | 3.02 |   |   |   |   |
|   | Co | 2.00 |   |   |   |   |
| 8 | Mn | 6.35 | 1,150 | 2 | 400 | 7 |
|   | Cu | 1.95 |   |   | 550 | 0.5 |
|   | Ti | 1.54 |   |   |   |   |
|   | Si | 0.94 |   |   |   |   |
| 9 | Mn | 12.00 | 1,100 | 2 | 400 | 5 |
|   | Cu | 2.00 |   |   | 550 | 1 |
|   | Ti | 3.00 |   |   |   |   |
|   | Si | 1.1 |   |   |   |   |
| 10 | Mn | 13.50 | 1,200 | 2 | 400 | 5 |
|    | Cu | 3.00 |   |   | 550 | 1 |
|    | Ti | 3.00 |   |   |   |   |
| 11 | Mn | 13.30 | 1,100 | 2 | 400 | 5 |
|    | Cu | 1.50 |   |   | 550 | 1 |
|    | Ti | 1.80 |   |   |   |   |
|    | Co | 4.00 |   |   |   |   |
|    | Cr | 3.00 |   |   |   |   |
| 12 | Mn | 12.00 | 1,100 | 2 | 400 | 5 |
|    | Cu | 3.00 |   |   | 550 | 1 |
|    | Ti | 3.00 |   |   |   |   |
| 13 | Mn | 10.04 | 1,100 | 2 | 400 | 5 |
|    | Cu | 5.00 |   |   | 550 | 1 |
|    | Ti | 2.65 |   |   |   |   |
|    | Si | 0.16 |   |   |   |   |
|    | C  | 0.012 |   |   |   |   |
| 14 | Mn | 10.72 | 1,100 | 2 | 400 | 5 |
|    | Cu | 0.60 |   |   | 550 | 1 |
|    | Ti | 3.64 |   |   |   |   |
|    | Si | 1.06 |   |   |   |   |
| 15 | Mn | 10.51 | 1,100 | 2 | 600 | 1 |
|    | Cu | 1.01 |   |   | 620 | 1 |
|    | Ti | 4.98 |   |   |   |   |
|    | Si | 0.70 |   |   |   |   |
| 16 | Mn | 11.58 | 1,100 | 2 | 600 | 1 |
|    | Cu | 2.02 |   |   | 620 | 1 |
|    | Ti | 0.74 |   |   |   |   |
|    | Si | 0.50 |   |   |   |   |

TABLE—Continued

| Example number | Component Element | Quantity, weight percent | Solution treatment Temp., °C. | Time, hrs. | Heat-treatment Temp., °C. | Time, hrs. |
|---|---|---|---|---|---|---|
| 17 | Mn | 12.50 | | | | |
|  | Cu | 2.00 | | | | |
|  | Ti | 3.00 | 1,100 | 2 | 400 | 5 |
|  | Si | 1.00 | | | 550 | |
|  | Ni | 1.00 | | | | |
| 18 | Mn | 12.50 | | | | |
|  | Cu | 2.00 | | | | |
|  | Ti | 3.00 | 1,100 | 2 | 400 | 5 |
|  | Si | 1.00 | | | 550 | 1 |
| 19 | Mn | 12.00 | | | | |
|  | Cu | 3.00 | | | | |
|  | Ti | 3.00 | 1,200 | 2 | 400 | 5 |
|  | Si | 0.30 | | | 550 | 1 |
|  | Cr | 6.00 | | | | |
| 20 | Mn | 12.00 | | | | |
|  | Cu | 3.00 | | | | |
|  | Ti | 3.00 | 1,100 | 2 | 400 | 5 |
|  | Si | 0.30 | | | 550 | 1 |
|  | Cr | 6.00 | | | | |
| 21 | Mn | 12.00 | | | | |
|  | Cu | 2.00 | | | | |
|  | Ti | 3.00 | 1,100 | 2 | 400 | 4 |
|  | Si | 1.00 | | | 550 | 1 |
|  | V | 1.00 | | | | |
| 22 | Mn | 12.00 | | | | |
|  | Cu | 2.00 | | | | |
|  | Ti | 3.00 | | | | |
|  | Si | 1.00 | 1,100 | 2 | 400 | 4 |
|  | V | 1.00 | | | 550 | 1 |
|  | Co | 2.00 | | | | |
| 23 | Mn | 10.10 | | | | |
|  | Cu | 2.00 | | | | |
|  | Ti | 1.80 | 1,100 | 2 | 580 | 1 |
|  | Cr | 1.90 | | | | |
|  | C | 0.03 | | | | |
| 24 | Mn | 10.10 | | | | |
|  | Cu | 2.00 | | | | |
|  | Ti | 1.80 | 1,100 | 2 | 580 | 1 |
|  | Cr | 5.90 | | | | |
|  | C | 0.03 | | | | |
| 25 | Mn | 12.00 | | | | |
|  | Cu | 3.00 | | | | |
|  | Ti | 3.00 | 1,100 | 2 | 400 | 3 |
|  | Co | 6.00 | | | 450 | 1 |
|  | C | 0.10 | | | 500 | 1 |
| 26 | Mn | 10.20 | | | | |
|  | Cu | 3.10 | | | | |
|  | Ti | 2.76 | 1,100 | 2 | 400 | 10 |
|  | Cr | 6.03 | | | 550 | 1 |
| 27 | Mn | 10.70 | | | | |
|  | Cu | 1.90 | | | | |
|  | Ti | 2.35 | 1,100 | 2 | 400 | 10 |
|  | Cr | 1.00 | | | 550 | 1 |
|  | Si | 0.70 | | | | |
| 28 | Mn | 10.59 | | | | |
|  | Cu | 2.96 | | | | |
|  | Ti | 2.76 | | | | |
|  | Cr | 3.00 | 1,100 | 2 | 400 | 5 |
|  | Co | 3.50 | | | 550 | 1 |
| 29 | Mn | 10.82 | | | | |
|  | Cu | 2.94 | | | | |
|  | Ti | 3.02 | 1,100 | 2 | 400 | 5 |
|  | Cr | 3.06 | | | 550 | 1 |
|  | Co | 1.00 | | | | |
| 30 | Mn | 10.54 | | | | |
|  | Cu | 2.99 | | | | |
|  | Ti | 2.57 | 1,100 | 2 | 400 | 5 |
|  | Cr | 3.22 | | | 550 | 1 |
|  | Ni | 3.00 | | | | |
| 31 | Mn | 11.09 | | | | |
|  | Cu | 2.97 | | | | |
|  | Ti | 2.56 | 1,100 | 2 | 400 | 5 |
|  | Cr | 3.08 | | | 550 | 1 |
|  | Ni | 1.00 | | | | |
| 32 | Mn | 10.10 | | | | |
|  | Cu | 2.00 | | | | |
|  | Ti | 1.80 | 1,100 | 2 | 600 | 1 |
|  | Si | 1.10 | | | | |
| 33 | Mn | 10.10 | | | | |
|  | Cu | 2.00 | 1,100 | 2 | 600 | 1 |
|  | Ti | 1.80 | | | | |
| 34 | Mn | 12.50 | | | | |
|  | Cu | 2.50 | | | 400 | 1 |
|  | Ti | 1.00 | 1,100 | 2 | 450 | 1 |
|  | Si | 1.00 | | | 500 | 1 |
| 35 | Mn | 10.96 | | | | |
|  | Cu | 2.05 | | | 510 | 1 |
|  | Ti | 2.32 | 1,100 | 2 | 530 | 1 |
|  | Si | 1.39 | | | 550 | 1 |
|  | Co | 1.00 | | | 600 | 1 |
| 36 | Mn | 10.87 | | | | |
|  | Cu | 2.98 | | | | |
|  | Ti | 2.89 | 1,100 | 2 | 400 | 5 |
|  | Cr | 2.96 | | | 550 | 1 |
|  | Si | .01 | | | | |
| 37 | Mn | 10.50 | | | | |
|  | Cu | 1.00 | | | | |
|  | Ti | 0.50 | 1,100 | 2 | 400 | 5 |
|  | Si | 2.96 | | | 550 | 1 |
| 38 | Mn | 12.50 | | | | |
|  | Cu | 2.50 | | | 400 | 3 |
|  | Ti | 1.00 | 1,100 | 2 | 450 | 1 |
|  | C | 0.1 | | | 500 | 1 |
| 39 | Mn | 11.50 | | | | |
|  | Cu | 3.00 | 1,100 | 2 | 400 | 5 |
|  | Ti | 3.00 | | | 550 | 1 |
| 40 | Mn | 11.80 | | | | |
|  | Cu | 3.10 | | | | |
|  | Ti | 2.70 | 1,100 | 2 | 400 | 5 |
|  | Cr | 3.20 | | | 550 | |
| 41 | Mn | 9.93 | | | | |
|  | Cu | 2.05 | | | | |
|  | Ti | 2.94 | 1,100 | 2 | 400 | 5 |
|  | Si | 0.93 | | | 550 | |
|  | Co | 1.00 | | | | |
| 42 | Mn | 11.34 | | | | |
|  | Cu | 5.07 | 1,100 | 2 | 400 | 5 |
|  | Ti | 2.26 | | | 550 | 1 |
|  | Cr | 2.18 | | | | |
| 43 | Mn | 11.08 | | | | |
|  | Cu | 2.97 | | | | |
|  | Ti | 2.93 | 1,100 | 2 | 400 | 5 |
|  | Cr | 3.07 | | | 550 | |
|  | Co | 2.00 | | | | |
| 44 | Mn | 12.22 | | | | |
|  | Cu | 3.26 | | | | |
|  | Ti | 2.82 | | | | |
|  | Cr | 3.42 | 1,100 | 2 | 400 | 5 |
|  | Co | 2.00 | | | 550 | 1 |
|  | Ni | 1.00 | | | | |
|  | V | 0.30 | | | | |
| 45 | Mn | 11.62 | | | | |
|  | Cu | 2.88 | | | | |
|  | Ti | 3.41 | 1,100 | 2 | 400 | 5 |
|  | Cr | 3.00 | | | 550 | 1 |
|  | Si | 0.30 | | | | |
|  | C | 0.2 | | | | |
| 46 | Mn | 13.05 | | | | |
|  | Cu | 2.97 | | | | |
|  | Ti | 2.93 | 1,100 | 2 | 400 | 5 |
|  | Cr | 1.07 | | | 550 | 1 |
|  | Co | 2.00 | | | | |
| 47 | Mn | 13 | | | | |
|  | Cu | 4 | | | | |
|  | Ti | 3.5 | 1,100 | 2 | 400 | 5 |
|  | Cr | 2 | | | 550 | 1 |
|  | Co | 2 | | | | |
| 48 | Mn | 13 | | | | |
|  | Cu | 3 | | | | |
|  | Ti | 3 | 1,100 | 2 | 400 | 5 |
|  | Ni | 1 | | | 550 | 1 |
|  | V | 3 | | | | |
| 49 | Mn | 12 | | | | |
|  | Cu | 3 | | | | |
|  | Ti | 3 | 1,100 | 2 | 400 | 5 |
|  | Co | 2 | | | 550 | |
|  | Ni | 1 | | | | |
|  | V | 3 | | | | |
| 50 | Mn | 9.88 | | | | |
|  | Cu | 2.94 | 1,100 | 2 | 400 | 5 |
|  | Cr | 1.87 | | | 550 | 0.5 |
|  | Ti | 0.00 | | | | |
| 51 | Mn | 9.88 | | | | |
|  | Cu | 2.94 | 1,100 | 2 | 400 | 5 |
|  | Cr | 1.87 | | | 550 | 2 |
|  | Ti | 0.00 | | | | |
| 52 | Mn | 11.5 | | | | |
|  | Cu | 1.5 | 1,100 | 2 | 400 | 5 |
|  | Cr | 3.0 | | | 550 | 1.5 |
|  | Ti | 0.4 | | | | |
|  | Co | 1.1 | | | | |

TABLE—Continued

| Example number | Component Element | Quantity, weight percent | Solution treatment Temp., °C. | Time, hrs. | Heat-treatment Temp., °C. | Time, hrs |
|---|---|---|---|---|---|---|
| 53 | Mn | 11.5 | | | | |
| | Cu | 1.5 | | | | |
| | Cr | 3.0 | 1,100 | 2 | 400 | 5 |
| | Ti | 0.4 | | | 550 | 3 |
| | Co | 1.1 | | | | |
| 54 | Mn | 11.02 | | | | |
| | Cu | 3.04 | 1,100 | 2 | 400 | 5 |
| | Cr | 2.05 | | | 550 | 1 |
| | Ti | 0.99 | | | | |
| 55 | Mn | 11.02 | | | | |
| | Cu | 3.04 | 1,100 | 2 | 400 | 5 |
| | Cr | 2.05 | | | 550 | 2 |
| | Ti | 0.99 | | | | |
| 56 | Mn | 10.5 | | | | |
| | Cu | 3.09 | 1,100 | 2 | 400 | 5 |
| | Cr | 1.99 | | | 550 | 1 |
| | Ti | 2.96 | | | | |
| 57 | Mn | 10.5 | | | | |
| | Cu | 3.09 | 1,100 | 2 | 400 | 5 |
| | Cr | 1.99 | | | 550 | 2 |
| | Ti | 2.96 | | | | |

The upper and lower limits of the quantity of each element are determined respectively in accordance with the following reasons.

Mn

Figure 2:
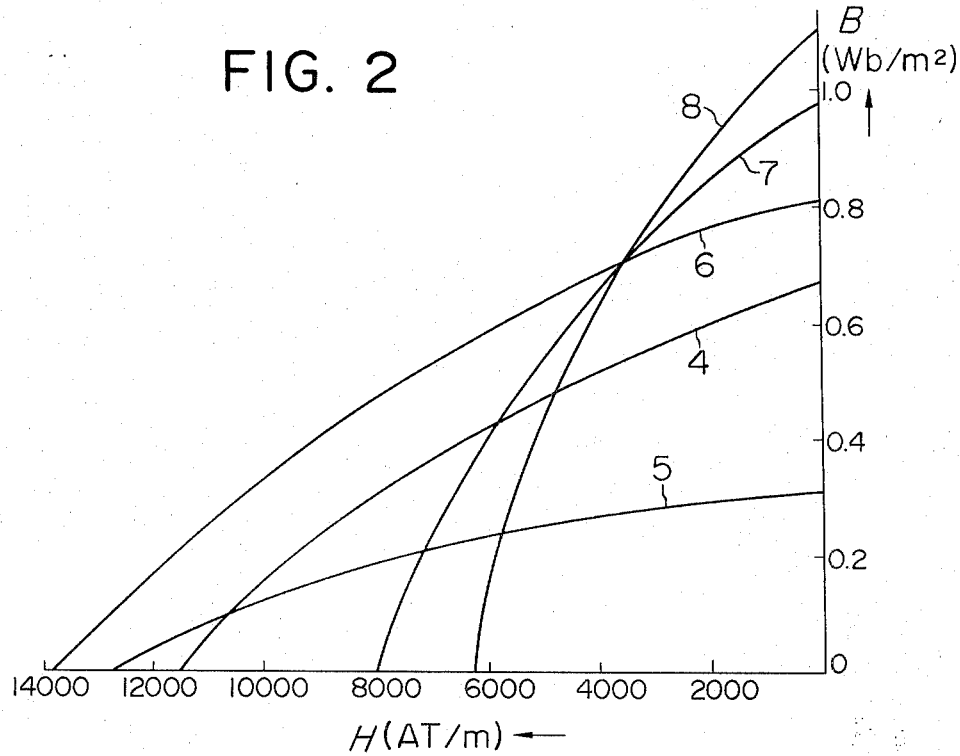

FIG. 1 indicates the magnetic characteristics of alloys consisting of Mn, Cu, Ti and balance of iron (Examples 1–3) in which the quantity of Mn is varied and other conditions are maintained constant. FIG. 2 indicates the magnetic characteristics of alloys including further components (Examples 4 through 8) in which the quantity of Mn is varied.

As indicated clearly in FIGS. 1 and 2, when the quantity of Mn is increased, the value of $H_c$ (coersive force) is increased, and the value of $B_r$ (residual flux density) is decreased generally, but too much of Mn will affect reversely. When the quantity of Mn exceeds 15%, the value of $B_r$ becomes excessively low, and the alloy required cold working as a further process to recover the property, which is unsuitable for practical use.

On the other hand, when the quantity of Mn is less than 5%, the value of $H_c$ becomes excessively low, and the alloy is inadequate for practical use.

Generally, in the case where a non-magnetic layer is dispersed in a ferro magnetic layer, the rate at which the best magnetic properties are obtained is theoretically 1 part of non-magnetic phase to 3 parts of magnetic phase. In the case of this invention, the quantity of Mn was selected to be 5% to 15%, consideration being given to the affects of other elements to be added.

Descriptions are set forth below showing the influence of the quantity of Mn on the characteristics of a hysteresis motor utilizing the alloy of this invention.

When the alloy is used in an outer-rotor type hysteresis motor, the alloy containing 7% to 13% of Mn is most suitable with respect to the magnetic characteristic, and it is almost equal to the well known Alnico materials, as well as in respect of starting torque and pull-in torque (cf. Table 1). However, when this alloy is used in an inner-rotor type hysteresis motor, it is inferior to Alnico alloy in pull-in torque, because the value of $H_c$ is not sufficiently large. Then, the alloy containing 13% to 15% of Mn is preferably used in order to increase the value of $H_c$ and to obtain higher pull-in torque.

TABLE 1

| | (A) Rotor produced by Alnico alloy | | | |
|---|---|---|---|---|
| | Rating of— Volts | Watts | Starting torque (g. cm.) | Pull-in torque (g. cm.) |
| Outer rotor | 50 | 10 | 85–75 | 55–40 |
| Inner rotor | 100 | 300 | 360 | 370 |
| | (B) Alloy containing 11.08% of Mn (Example 43) | | | |
| Outer rotor | 50 | 9.5 | 87 | 55 |
| Inner rotor | 100 | 31 | 480 | 220 |
| | (C) Alloy containing 13.05% of Mn (Example 46) | | | |
| Inner rotor | 100 | 31 | 370 | 360 |

When the quantity of Mn exceeds 13%, it is preferable that the quantity of Cu be kept below 3%, and the quanitiy of Ti be kept below 4% to prevent decrease of the $B_r$ value, because both Cu and Ti act to decrease the $B_r$ value. When the quantity of Mn is increased, it is preferable that Cr, Co, Ni and V be added, because each of these elements acts to prevent decrease of $B_r$ value.

Figure 3:
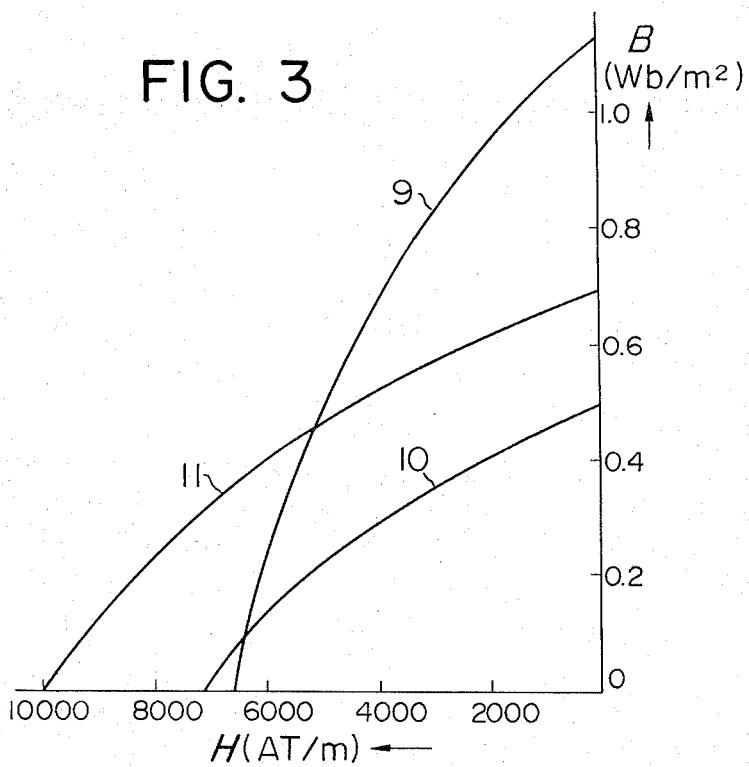

FIG. 3 indicates the differences between the magnetic characteristics of an alloy containing 12.0% of Mn (Example 9), an alloy containing 13.5% of Mn (Example 10), and an alloy containing 13.3% of Mn (Example 11).

As indicated clearly in FIG. 3, when the quantity of Mn is increased, the value of $H_c$ can be increased, and moreover, when Cr, Co, Ni, V, etc., are added, decrease of the $B_r$ value can be prevented.

Cu

Cu is dissolved in to a supersaturated solid solution and acts to impart lattice strain, and the quantity thereof is selected to be from 0.2% to 5% depending on the quantity of the solid solution.

When Cu is added, a $B_r$ value which is higher than the value of the alloy without the Cu is obtained until the $H_c$ value indicates approximately 10,00 AT/m.

Figure 4:
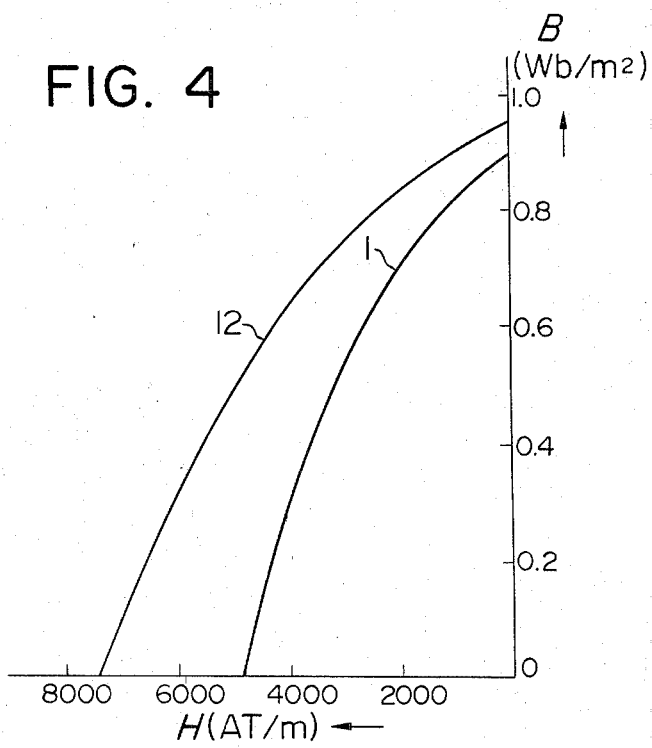

FIG. 4 indicates the variation of magnetic characteristics which are obtained by keeping constant the conditions except the quantity of Cu and varying the quantity of Cu (cf. Examples 1 and 12).

Cu acts to decrease the $B_r$ value, and when the quantity thereof exceeds 5%, the alloy becomes inadequate for practical use because the $B_r$ value thereof is excessively low. When the Cu quantity is less than 0.2%, an improvement of the magnetic property cannot be established well.

The magnetic properties of Cu-added alloys as well as alloys without Cu addition are influenced by the content of Mn, alloys containing less Mn exhibiting better magnetic properties.

When the quantity of Mn is comparatively great, it is preferable that the quantity of Cu be decreased to prevent decrease of the $B_r$ value.

Figure 5:
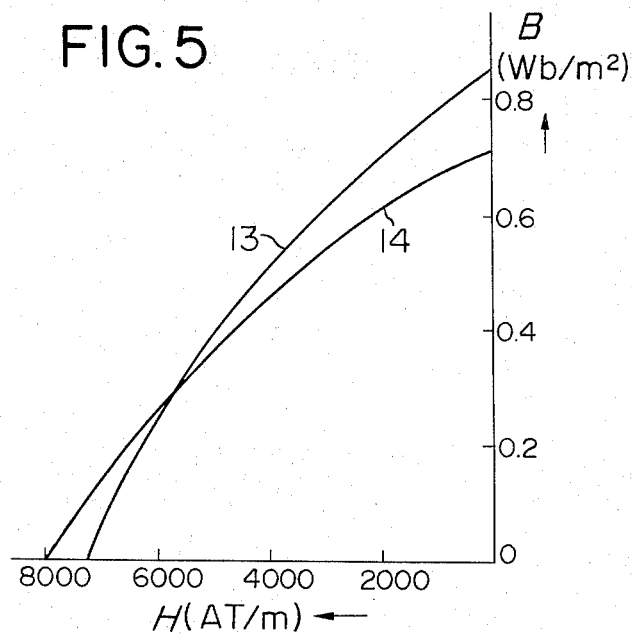
Figure 6:
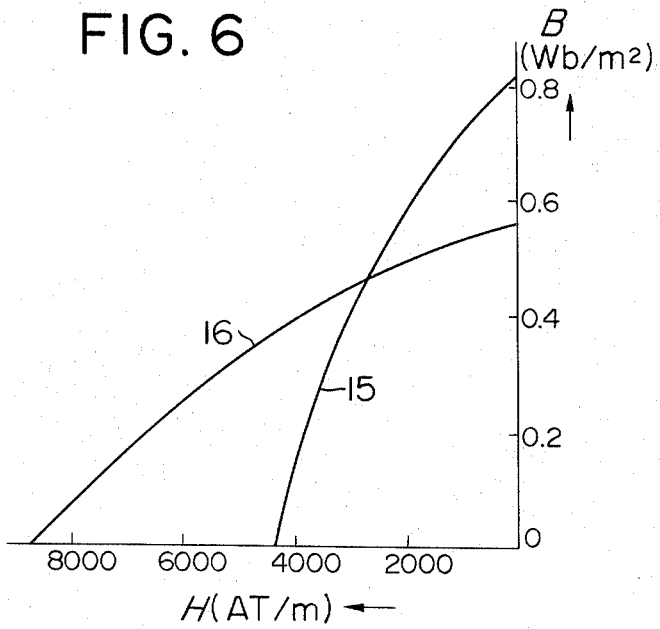

FIG. 5 indicates the comparison of magnetic characteristics of an alloy containing a comparatively greater quantity of Cu (Example 13) and an alloy containing a comparatively smaller quantity of Cu (Example 14).

Ti

Ti acts to produce finely crystallized articles and precipitation $\tau$ phase, but when the quantity thereof is less than 0.4% the above-mentioned actions cannot be sufficiently obtained. Moreover, Ti also acts to decrease the $B_r$ value similarly as Cu, and when the quantity thereof exceeds 7%, the alloy becomes inadequate for practical use because the $B_r$ value is too low. When the quantity if Mn is comparatively greater, it is also preferable that the quantity of Ti be decreased to prevent decrease of the $B_r$ value.

As a result, the quantity of titanium required for the present invention is 0.4% to 7% by weight. Titanium is used for maintaining the crystallized particles obtained by the solidification of molten metals small in size. Moreover, the titanium stops and controls the excessive growth of the crystallized particles, this growth being caused by the subsequent heat-treatment, and is not used for reducing the size of the precipitation. When titanium is not present in the molten metal the crystallized particles are enlarged in size by the solidification of the molten metals, thereby requiring strong cold working to reduce the dimensions of the crystallized particles. Therefore, when the titanium is absent in the alloy, it is impossible to impart the desired property to the same only by heat-treatment without cold working. On the other hand, when the titanium is present in a small amount such as 0.4% the desired property is imparted to the alloy only by the heat-treatment, without the cold working.

FIG. 6 and FIGS. 38–41 indicate differences in magnetic characteristics due to variation of the quantity of Ti. (cf. Examples 15 and 16, and Examples 50–57.)

Figure 38:
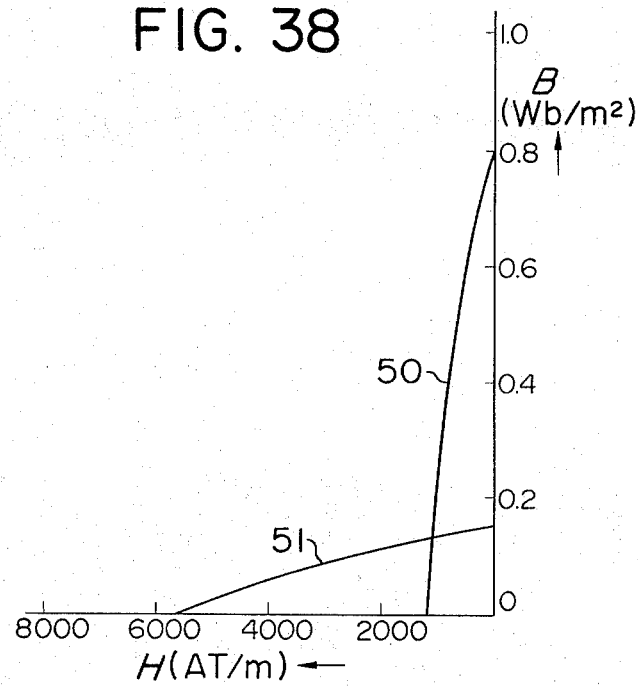
FIG. 38 is a graphical representation indicating magnetic characteristics of alloys in which the Ti-component is absent.

As obvious from the aforementioned FIG. 38, when the quantity of Ti is "0.00," the required properties cannot be obtained. (cf. Examples 50 and 51.)

Figure 39:
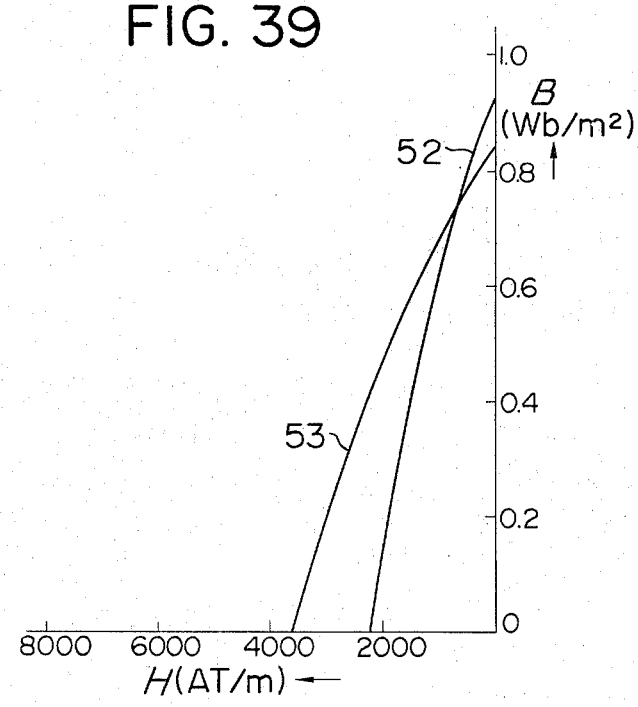
Figure 40:
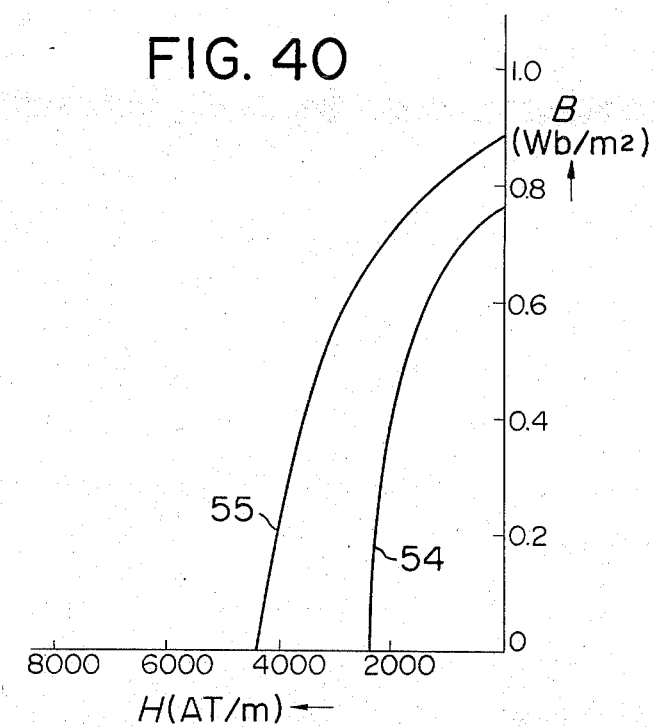
Figure 41:
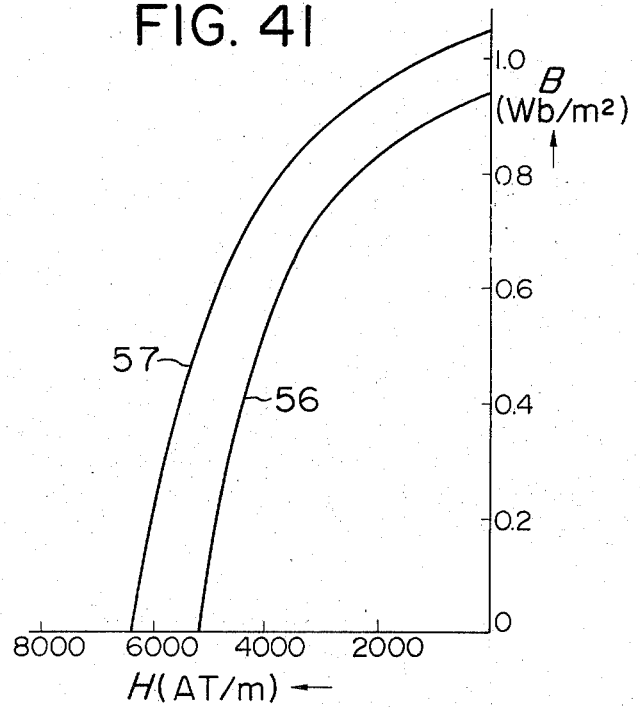

Furthermore, as obvious from the aforementioned FIG. 39, when the quantity of Ti is "0.4," the required properties are obtained. (Examples 52 and 53.)

However, the aforementioned quantity of "0.4" is not critical. It should be noted that the required properties are gradually created with the increase of the quantities of Ti, as obvious from the aforementioned FIG. 6 and FIGS. 38–41. (cf. Examples 15–16, 50–57.)

Cr, Co, Ni, V

Cr, Co, Ni, and V act to obstruct phase transition, to improve magnetic properties and to stabilize the formed ferro magnetic α phase.

The quantities of Cr and V of the above mentioned elements are selected to lie within the ranges of 0.1% to 8% Cr, 0.1% to 6% V, because the $B_r$ value is remarkably decreased when the quantities thereof exceed too much. Ni has an advantage of reducing the time of heat-treatment, but we have found that the quantity thereof should be within the range of 0.1% to 3%, because the $B_r$ value is remarkably decreased when the quantity thereof exceeds 3%.

The greater the quantity of the Co becomes, the greater is the improvement in the $B_r$ value which can be attained, and Co will not impair the magnetic property. However, when the quantity of the Co exceeds 50%, the cost of the products becomes too high, because Co is very expensive.

It is considered that these elements act to keep the magnetization rate against the elevation of temperature, that is, to improve the magnetic temperature characteristic, because they act to stabilize the formed α phase as stated above.

The temperature dependency of the magnetization rate of an alloy was measured by a magnetic balance. As a result, it was found that the occurrence of phase transition was promoted at a temperature of more than 50° C. in an alloy to which only Si was added, but it was found that, in an alloy to which Cr, Co, Ni, and V were added, the temperature dependency of magnetization rate was not noticed.

Figure 7:
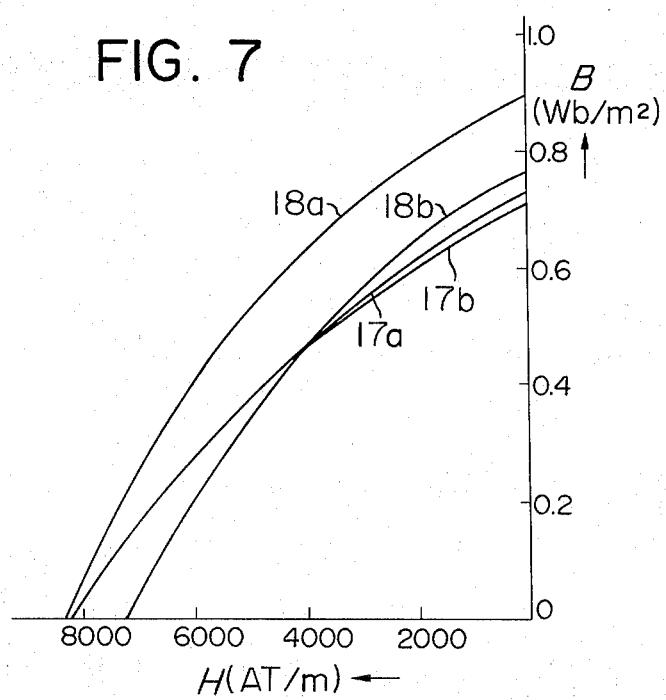

FIG. 7 indicates the variation of magnetic characteristics measured after the continuous operation of a hystereis motor made from the alloy to which Ni was added (Example 17) and the alloy to which Ni was not added (Example 18). In this figure, the curves "α" respectively indicate the characteristics obtained at the starting point of the experiment, and the curves "b" indicate the characteristics obtained after 1,000 hours of operation which comprised repeated cycles each consisting of 8 hours of operation followed by from 10 to 20 minutes of rest at room temperature.

As is obvious from this figure, both the $H_c$ value and $B_r$ value of an alloy to which Ni has been added do not vary appreciably.

The following Table 2 indicates the comparison of the properties of hysteresis motors made from an alloy to which Ni is added, and made from an alloy to which Ni is not added.

TABLE 2

|  | (A) Alloy containing 1% of Ni (Example 17) | |
| --- | --- | --- |
|  | Starting torque (g. cm.) | Pull-in torque (g. cm.) |
| Starting point of the test | 75 | 50 |
| After 1,000 hours | 75 | 50 |
|  | (B) Alloy not containing Ni (Example 18) | |
|  | Starting torque (g. cm.) | Pull-in torque (g. cm.) |
| Starting point of the test | 92 | 43 |
| After 1,000 hours | 70 | 41 |

If the quantities of Co, Ni, Cr, and V are increased, the magnetic characteristic in respect of temperature can be improved, and, moreover, the temperature differences of the heat-treatment due to the variation of the quantity of Mn can be eliminated. When the quantity of Mn is comparatively great, it is necessary that the temperature of heat-treatment is kept low, and when the quantity of Mn is small, it is necessary that the temperature is kept high. When the temperature of the heat-treatment is varied, very complex processes are required, and mass-productivity is remarkably reduced. The analysis value of Mn should be kept within the range of ±0.5% to improve the mass-productivity at a constant temperature of heat treatment. However, when the casting is carried out by a method such as the vacuum dissolving method, it is difficult to maintain the analysis value of Mn within the range of ±0.5%. Therefore, Cr, Co, Ni and V are preferably added for increasing the allowance range of the analysis value of Mn, and further for eliminating the necessity of varying the temperature of the heat-treatment. These elements act to suppress the particular functions of Mn and to increase the allowance range of the analysis value approximately to the range of ±1%.

Figure 8:
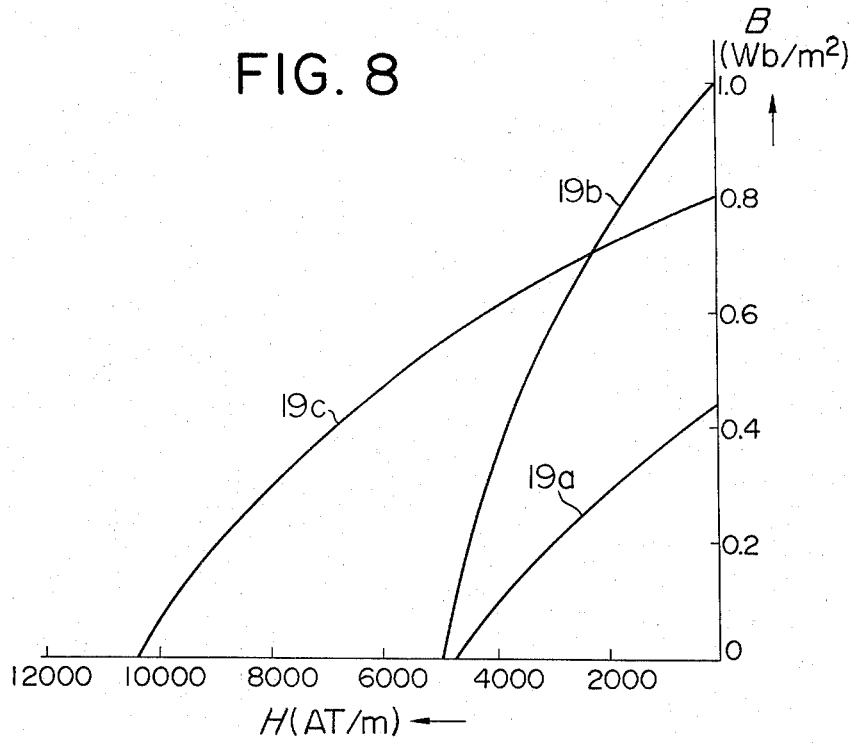

FIG. 8 indicates magnetic characteristics of an alloy containing 6% Cr (Example 19), "a" indicates the magnetic characteristic obtained before heat-treatment thereof, "b" indicates that obtained after heat-treatment for five hours at 400° C., and "c" indicates that obtained after a further treatment in which the temperature is subsequently lowered below 100° C. and heat-treatment is carried out again at 550° C. for 1 hour.

If the hysteresis motor made from this alloy (Cr=6%) is compared with the one made from the alloy containing 3% Cr (Example 20), the starting torque of the motor made from the alloy containing a greater quantity of Cr is a little lower, but the pull-in torque thereof is better. (cf. the following Table 3).

TABLE 3

|  | (A) Alloy containing 6% of Cr. (Example 19) | |
| --- | --- | --- |
|  | Starting torque (g. cm.) | Pull-in torque (g. cm.) |
| Starting point of the experiment | 65 | 60 |
| After 1,000 hours | 65 | 60 |
|  | (B) Alloy containing 3% of Cr (Example 20) | |
|  |  |  |
| Starting point of the test | 75 | 50 |
| After 1,000 hours [1] | 75 | 50 |

[1] 1,000 hours of operation comprising repeated cycles each of 8 hours of continuous running followed by from 10–20 minutes of rest at approximately room temperature.

Figure 9:
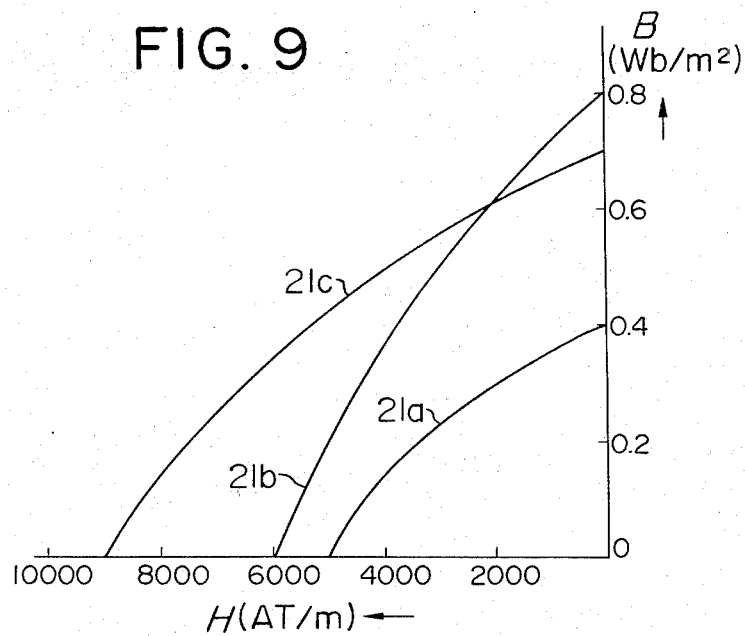

FIG. 9 indicates the magnetic characteristics of an alloy containing 1% of V (Example 21). Curve "a" indicates the magnetic characteristic obtained before heat-treatment, "b" indicates that obtained by the heat of the alloy at 400° C. for four hours, and "c" indicates that obtained by the cooling thereof below 100° C. and the subsequent heating thereof at 550° C. for one hour.

Figure 10:
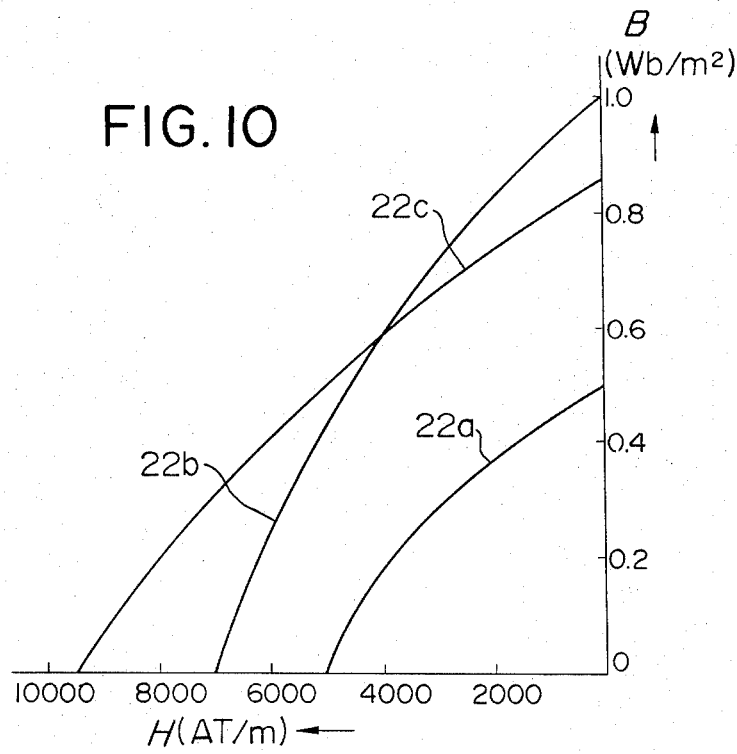

FIG. 10 indicates the magnetic characteristics of an alloy containing 1% of V, 2% of Co (Example 22), "a" indicating the magnetic characteristic obtained before heat-treatment of the alloy, "b" indicating that obtained by the heating thereof 400° C. for four hours, and "c" indicating that obtained by the cooling thereof below 100° C. and the subsequent heating thereof at 500° C., for one hour.

Figure 11:
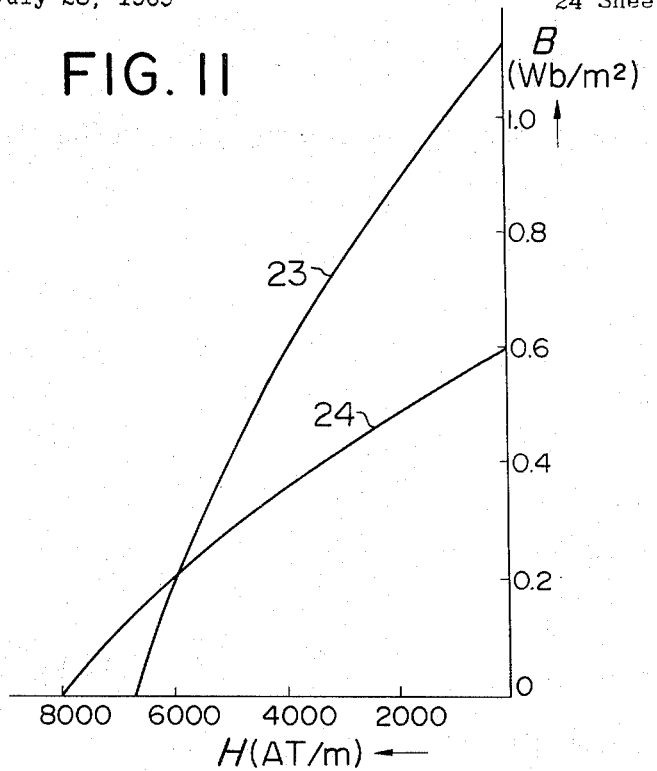

FIG. 11 indicates the magnetic characteristics of an alloy containing 1.9% of Cr (Example 23) and an alloy containing 5.9% of Cr (Example 24).

Figure 12:
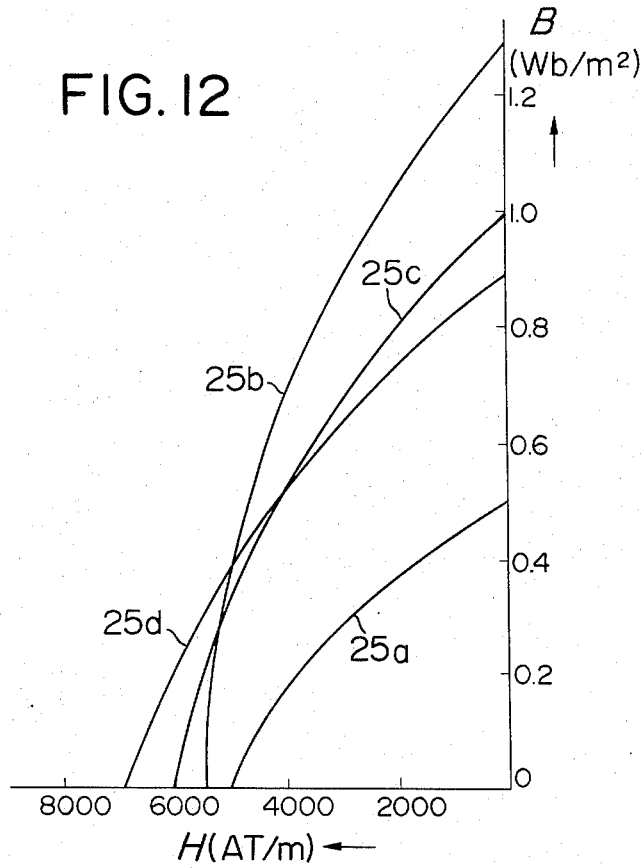

FIG. 12 indicates the magnetic characteristics of an alloy containing 6% of Co (Example 25). In this figure, "a" indicated the magnetic characteristic obtained before heat-treatment of the alloy, "b" indicates that obtained by the heating thereof at 400° C. for three hours, "c" indicates that obtained by the cooling thereof below 100° C. and the subsequent heating thereof at 450°C. for 1 hour, and "d" indicates that obtained further by the cooling thereof below 100° C. and the subsequent heating thereof at 500° C. for 1 hour.

Figure 13:
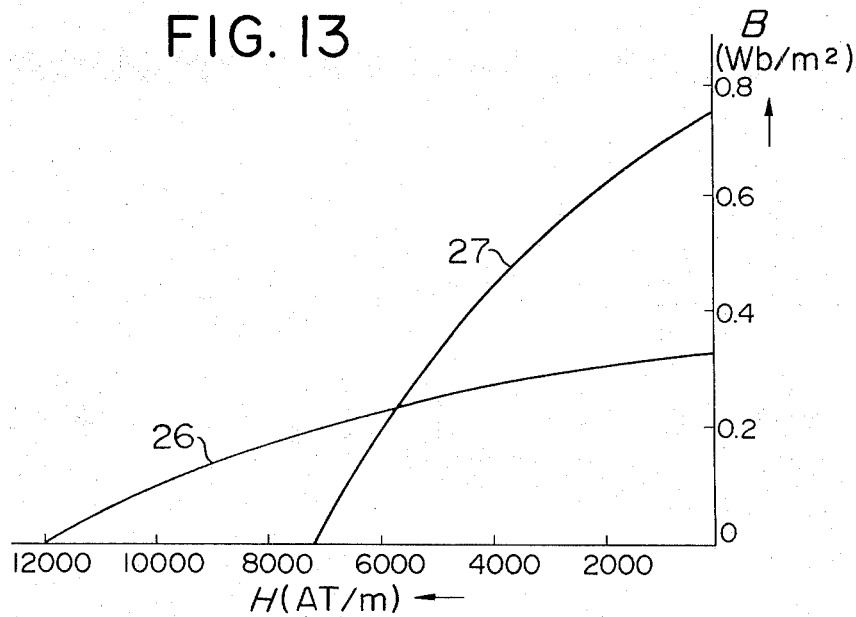

FIG. 13 indicates the magnetic characteristics of an alloy containing 6.03% of Cr (Example 26) and an alloy containing 1.0% of Cr (Example 27), showing the effect of Cr.

Figure 14:
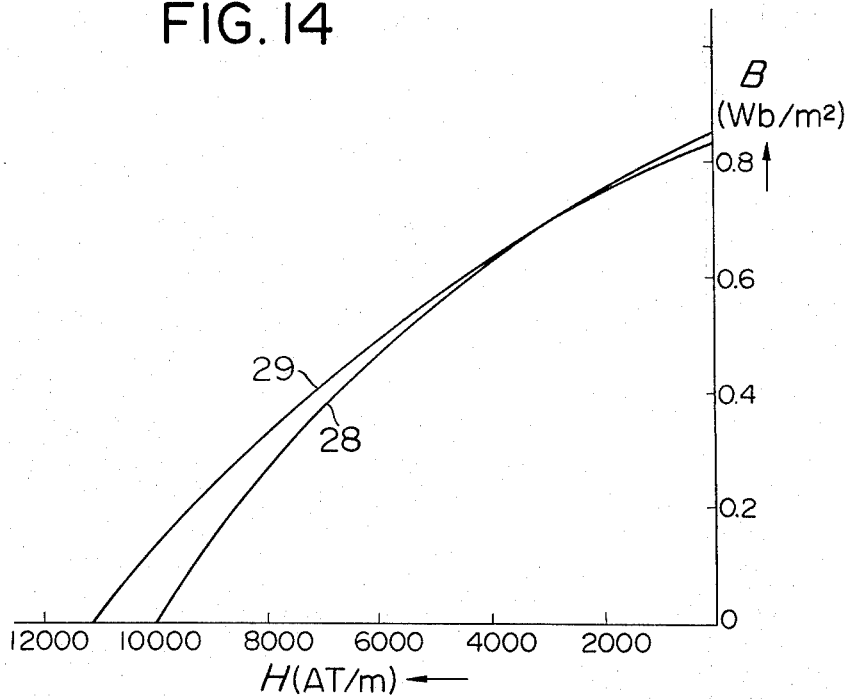

FIG. 14 indicates the magnetic characteristics of an alloy containing 3.5% of Co (Example 28) and an alloy containing 1.0% of Co (Example 29), showing the effect of Co.

Figure 15:
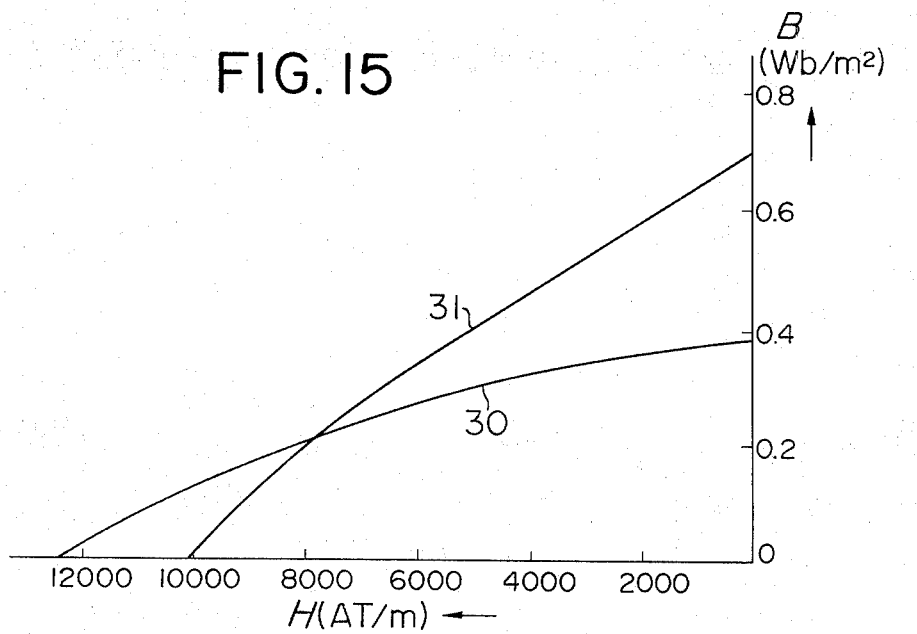

FIG. 15 indicates the magnetic characteristics of an alloy containing 3.0% of Ni (Example 30) and an alloy containing 1.0% of Ni (Example 31), showing the effect of Ni.

Si, Ge, Sn, Zn, Nb, B, Te, W, S, Pb, Mo, Al, P

Each of Si, Ge, Sn, Zr, Nb, B, Te, W, S, Pb, Mo, Al and P acts to improve the flow of the molten alloy in casting, to suppress the occurrence of blowholes, and to improve the machine workability.

Si and Ge act to improve also the magnetic properties, especially the $B_r$ value. Moreover, Si and Ge do not influence the quantity of other elements, and also are not influenced by said quantity, and, further, the magnetic characteristic is not impaired when the quantities are kept respectively within the range of 2.5% and 3.0%. However, the other elements than Ge, Si mutually influence the quantities of the other elements, so that when the total quantity thereof exceed 2.0%, the magnetic characteristic is remarkably impaired.

Si acts to facilitate the transition of a non-magnetic $\gamma$ phase produced by the solution treatment to a ferro magnetic $\alpha$ phase because this non-magnetic $\gamma$ phase which is generally stable at elevated temperatures is unstabilized, and further acts to improve the magnetic characteristic because the influence of C and other elements which obstructs the phase transition is eliminated.

Figure 16:
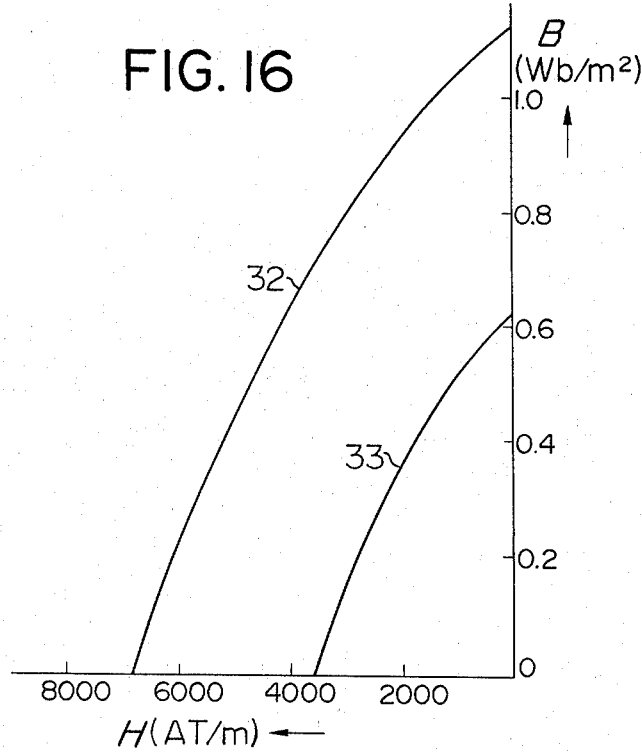

FIG. 16 indicates the magnetic characteristics of an alloy containing 1% of Si (Example 32) and an alloy which is substantially the same alloy except that Si has not been added (Example 33), showing the effect of Si.

Figure 17:
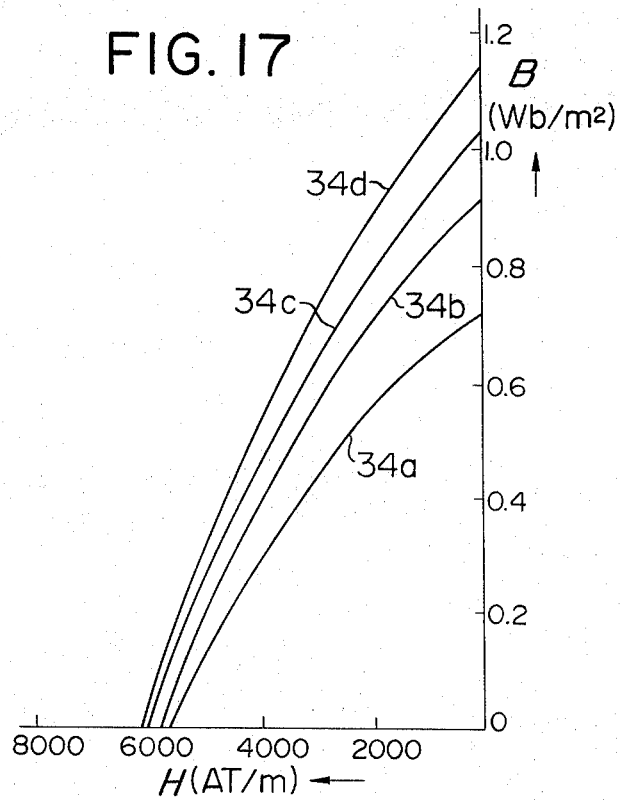

FIG. 17 indicates the magnetic characteristics of an alloy containing 1% of Si (Example 34) showing the effect of heat-treatments. In this figure, curve "a" indicates the magnetic characteristic obtained before heat-treatment of the alloy, "b" indicates that obtained by the heating thereof at 400° C. for 1 hour, "c" indicates that obtained by the cooling thereof below 100° C. and the subsequent heating thereof at 450° C. for 1 hour, and "d" indicates that obtained further by the cooling thereof below 100° C. and the subsequent heating thereof at 550° C. for 1 hour.

Figure 18:
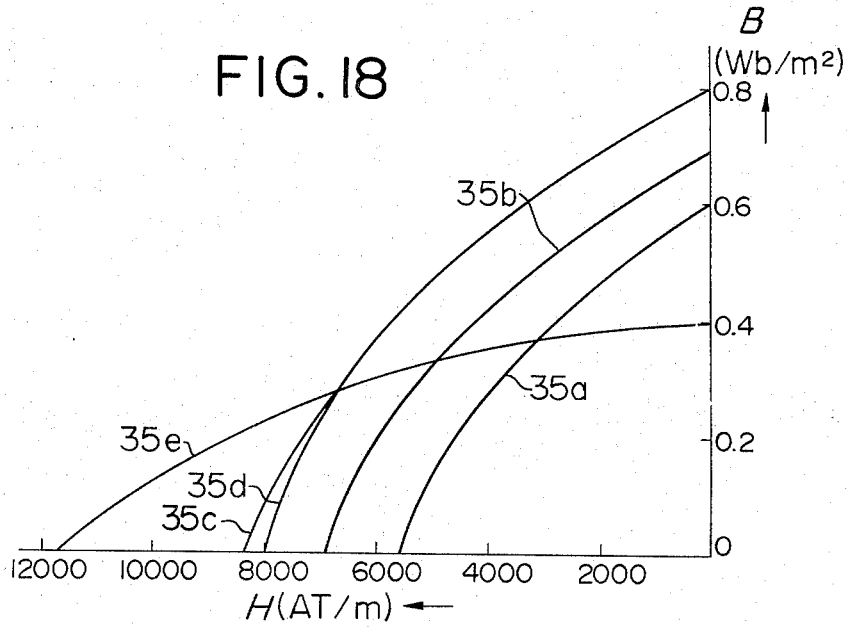

FIG. 18 indicates the magnetic characteristics of an alloy containing 1.39% of Si (Example 35). In this figure, "a" indicates magnetic characteristic obtained before heat-treatment thereof, "b" indicates that obtained by the heating thereof at 510° C. for 1 hour, "c" indicates that obtained by the cooling thereof below 100° C. and the subsequent heating thereof at 530° C. for 1 hour, "d" indicates that obtained by the cooling thereof below 100° C. and the subsequent heating thereof at 550° C., and "e" indicates that obtained by the cooling thereof below 100° C. and the subsequent heating thereof at 600° C. for 1 hour.

Figure 19:
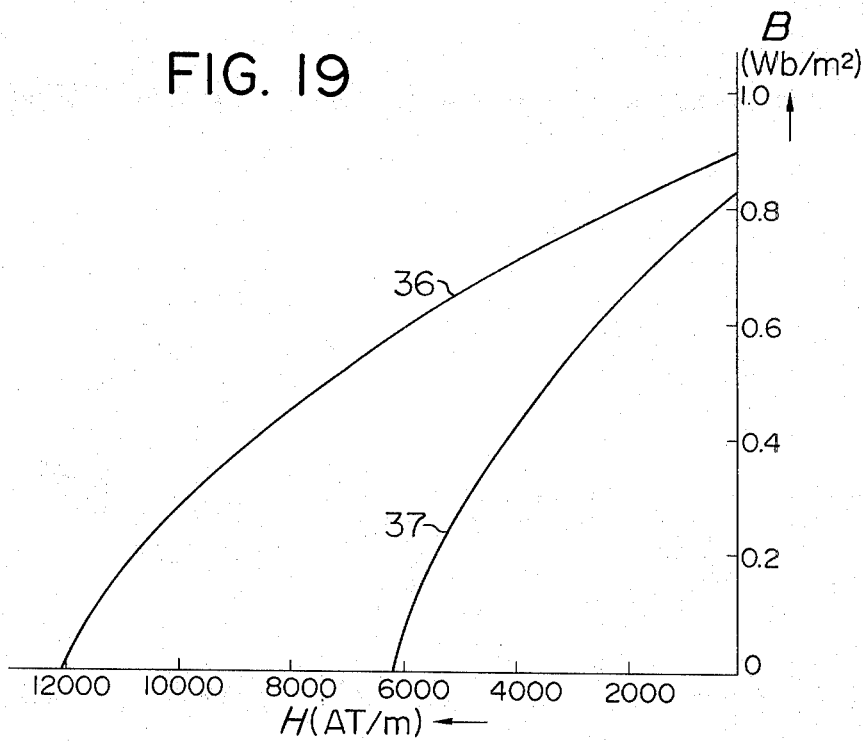

FIG. 19 indicates the magnetic characteristics of an alloy containing 0.01% of Si (Example 36) and an alloy containing 2.96% of Si (Example 37).

The following Table 4 indicates the results obtained by measuring the effects of the elements capable of improving the mouldability and the machine workability of alloys.

PROCEDURE OF EXPERIMENT

First, each of these elements to be added was added to the alloys containing 12% of Mn, 2% of Cu, 3% of Ti, and 1% of Co respectively in the quantity of 1%, and 12 kinds of base materials were produced. In each of these base materials, Si is contained in a quantity in the range of 0.01–2.5%. Electrolytic iron, electrolytic manganese, electric copper, sponge titanium, etc., were used as the materials and were weighed so that the total weight thereof was 7 kg. These materials were melted in inert Ar gas and then casted in a 60-mm. diameter metal mould. As a result, an ingot of 60 mm. diam. × 300 to 500 mm. length was obtained. Ring material of an outer diameter of 48 mm., and inner diameter of 40 mm., and a thickness of 12 mm. were cut off from the ingot for the measurement of the magnetic properties, which ring material was heat treated at 550° C. for 1 hour.

Figure 20:
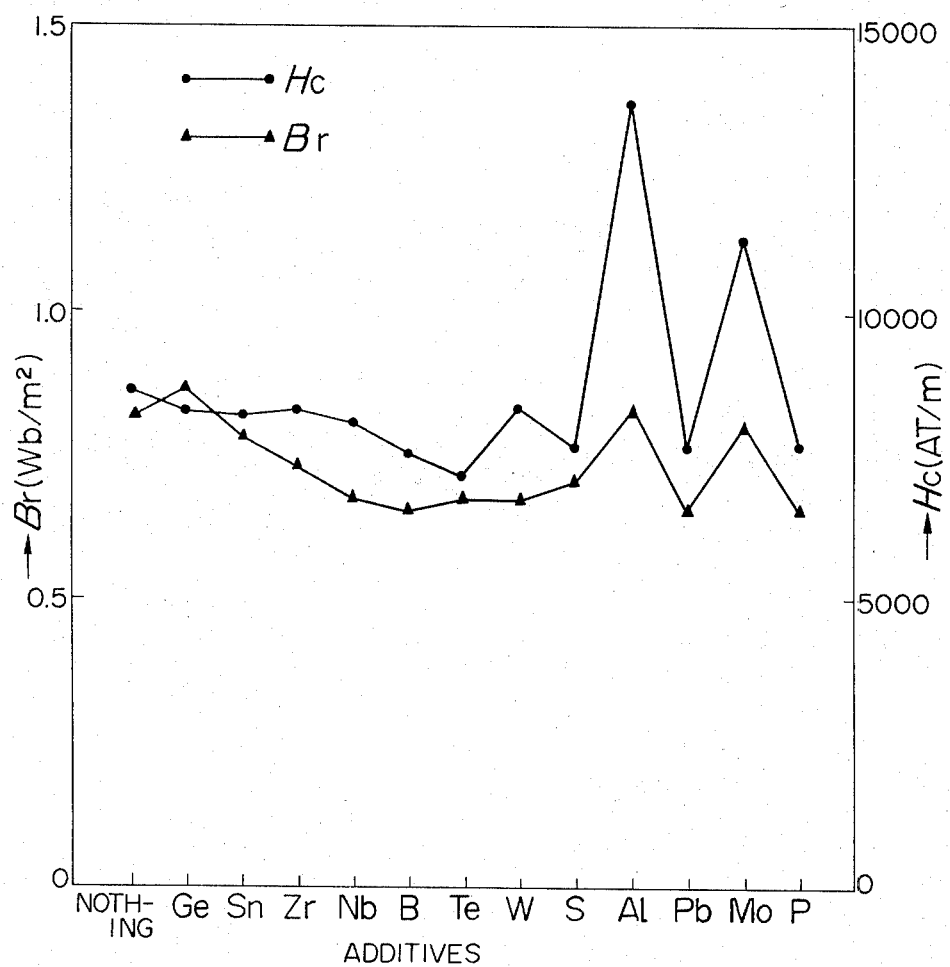

FIG. 20 indicates the magnetic properties of $H_c$ and $B_r$ of the heat-treated ring material, showing the variation thereof in accordance with each kind of material added.

Figure 21:
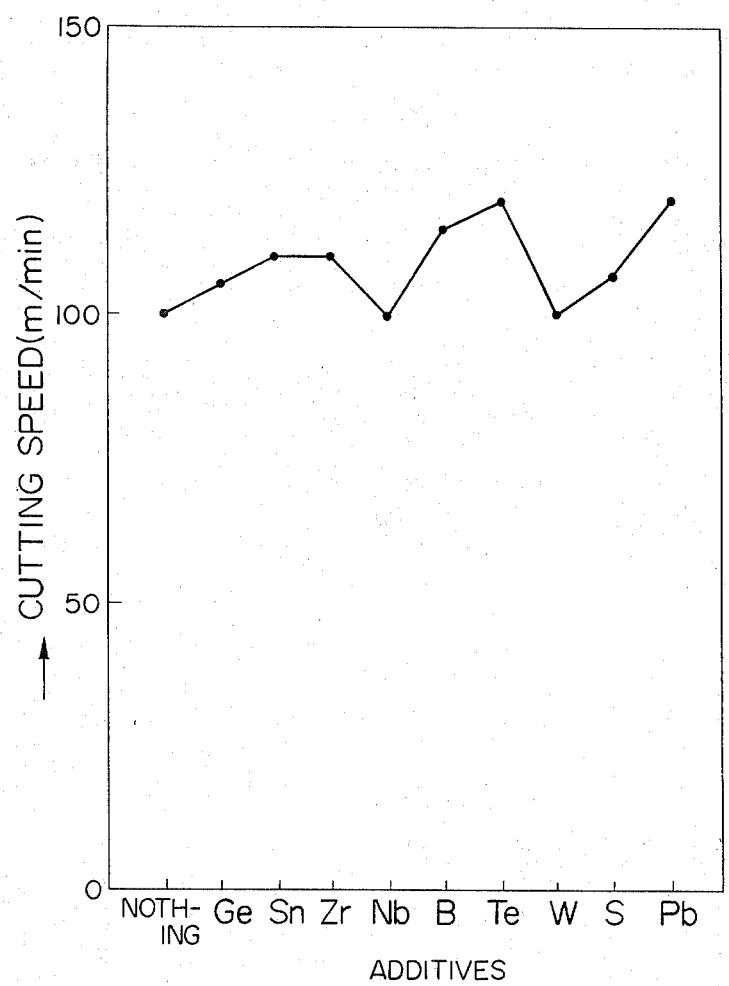
FIG. 21 is a graphical chart indicating machine workabilities of these alloys.

FIG. 21 indicates the maximum cutting speed of each of the ring materials, all cutting operations being carried out with the same cutting tool (SKD 12 type).

Figure 22:
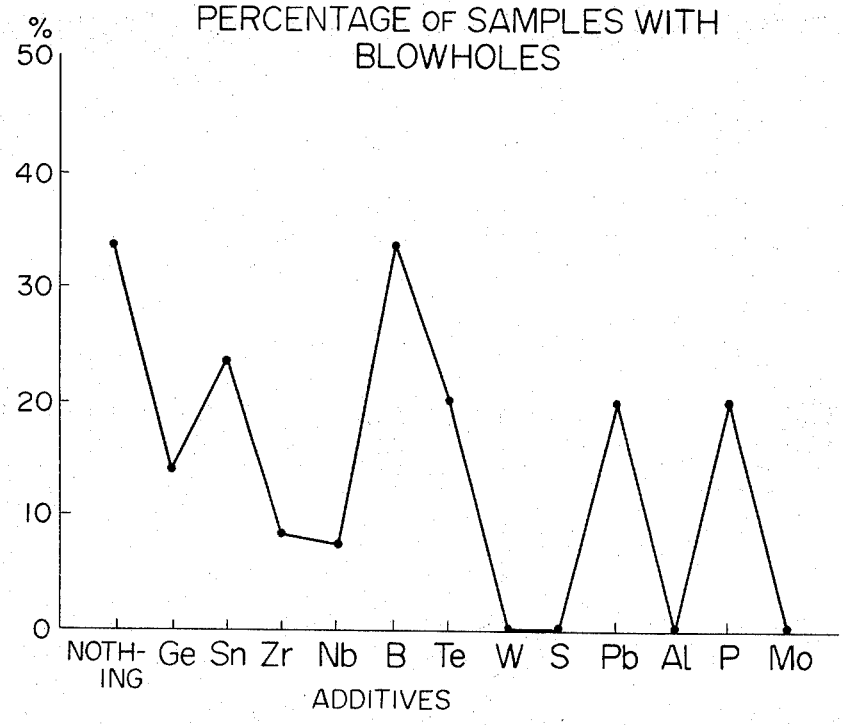
FIG. 22 is a graphical chart indicating the castabilities of these alloys.

FIG. 22 indicates the mouldability of each of the ring materials, showing the percentage of samples with blowholes out of the cut-off ring samples. The number of samples of the ring material and the number of samples with blowholes in FIG. 22 are indicated below.

TABLE 4

| Materials added | Nothing | Ge | Sn | Zr | Nb | B | Te | W | S | Al | Mo | P | Pb |
|---|---|---|---|---|---|---|---|---|---|---|---|---|---|
| Number of samples in all | 12 | 14 | 13 | 13 | 12 | 12 | 15 | 12 | 14 | 14 | 12 | 15 | 15 |
| Number of samples with blowholes. | 4 | 2 | 3 | 1 | 2 | 4 | 3 | 0 | 0 | 0 | 0 | 3 | 3 |

According to the results of this experiment, all of the ring materials indicated magnetic properties of higher values than the values generally required for ring materials for hysteresis motors ($H_c$ value exceeding 5,000 AT/m., $B_r$ value exceeding 0.6 Wb/m.², and, especially, the $B_r$ values of the ring materials were improved when Ge was added.

Further, these materials have excellent cutting workability, maximum cutting speed being more than 100 m./ min., and especially those to which B, Te, P, Pb have been added showing values exceeding 110 m./min.

Further, the mouldability of the ring material to which W, S, Al, Mo have been added was very good since there were no samples having blowholes.

The quantity of Si in each of the ring materials was 0.01 to 2.5%, and the magnetic properties and cutting workability thereof were somewhat variable with the quantity of Si. However, the magnetic properties are greater than the value required generally for ring materials for hysteresis motors, and when the magnetic properties, cutting workability, and mouldability are all considered, all the samples can be said improved in comparison with each of the materials without Si.

IMPURITIES

The content of impurities in the alloy of this invention is preferably a small quantity.

In particular, C acts to prevent the non-magnetic $\gamma$ phase from being unstabilized to transform to a ferro magnetic $\alpha$ phase, and therefore when the content exceeds 0.3%, the magnetic properties are remarkably decreased.

Figure 23:
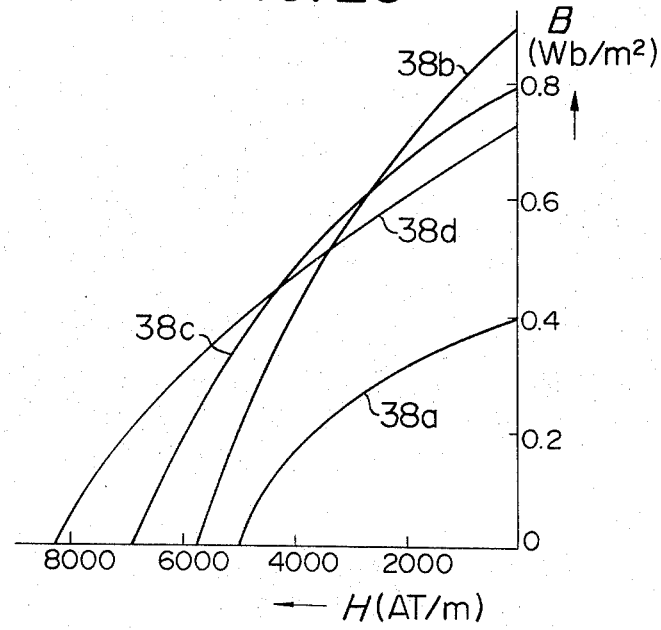

FIG. 23 indicates magnetic characteristics of an alloy containing 0.1% of C (Example 38). In this figure, curve "a" indicates the magnetic characteristic obtained before heat treatment of the alloy "b" indicates that obtained by the heating thereof at 400° C. for 3 hours, "c" indicates that obtained by the cooling thereof below 100° C. and subsequent heating thereof at 450° C. for 1 hour, and "d" indicates that obtained by the cooling thereof below 100° C. and the subsequent heating thereof at 500° C. for 1 hour.

A study on the influence by the said each metals added was made, and as a result, the following discoveries were made.

(1) In a Fe-Mn alloy, when the average number of Ar outer-shell electrons, which is the average number of $3d+4S$ electrons is 7.8 to 8 (this corresponds to the quantity of Mn of 7% to 15%), remarkably excellent magnetic properties can be obtained.

(2) In combined adaptation of 3d transition metals of Cu-Ti, Cr-Co, Cr-Ni, V-Ni, Sc-Co, Sc-Ni etc., the adaptation proves effective when the average number of Ar outer-electrons is 11-3, and when the number is less than the average number of the Fe-Mn alloy, the effectiveness is mainly obtained with respect to the $H_c$ value, while when this number is higher, the effectiveness is mainly obtained with respect to the $B_r$ value.

(3) Metals added such as Si, Ge, Al, Mo, B, P and S (not 3d transition metals) act to improve the magnetic properties by producing fine crystal structures although they do not act to give substantial improvement of magnetic properties by influencing the electron structure of the Fe-Mn alloy, and further, they especially give excellent metal flow in casting and remarkable improvement in machine workability of the products. The maximum quantity thereof added is 2% by weight in the metal when poured. The present invention is based on the above-described considerations and is the result of our past study.

The number of Ar outer-shell electrons of 3d transition metals of the present invention are indicated as follows by dividing them into 4S and 3d, the basic alloy component being omitted.

|    | Sc | V | Cr | Co | Ni | Zn |
|----|----|---|----|----|----|----|
| 4S | 2  | 2 | 1  | 2  | 2  | 2  |
| 3d | 1  | 3 | 5  | 7  | 8  | 10 |

The expression "average number of Ar outer-shell electrons" means the number of outer-shell electrons thereof by themselves when one of the 3d transition metals is used as a metal added and means the total number of electron contributions obtained from all of the metals calculated by the atomic rate thereof when more than two of them are used.

The quantity of 3d transition metals as the metals added is naturally limited in order to obtain semi-hard magnetic materials having the above said magnetic characteristic (especially an $H_c$ value of more than 4,800 at/m and a $B_r$ value of more than 0.7 Wb/m.²). Accordingly, the maximum quantities of 3d transition metals to be added are 3% of Sc, 6% of V, 8% of Cr, Co, 3% of Ni, and 2% of Zn, respectively. When more than one of the 3d transition metals are added, their percentages are determined according to the average number of Ar outer-shell electrons as follows. (The quantity of each to be added is limited as described above.)

| Average number of Ar outer-shell electrons: | Maximum quantity to be added (percent by weight in alloy produced) |
|---|---|
| 4 or less | 3 |
| More than 4 up to 6 | 7 |
| More than 6 up to 10 | 9 |
| More than 10 up to 11 | 7 |
| More than 11 up to 12 | 2 |

Figure 35:
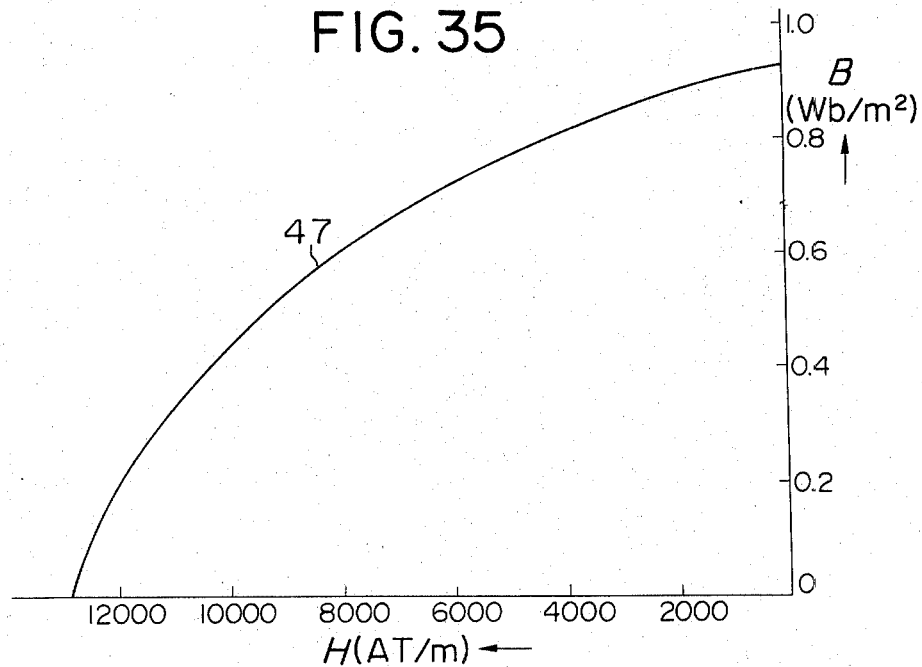
Figure 36:
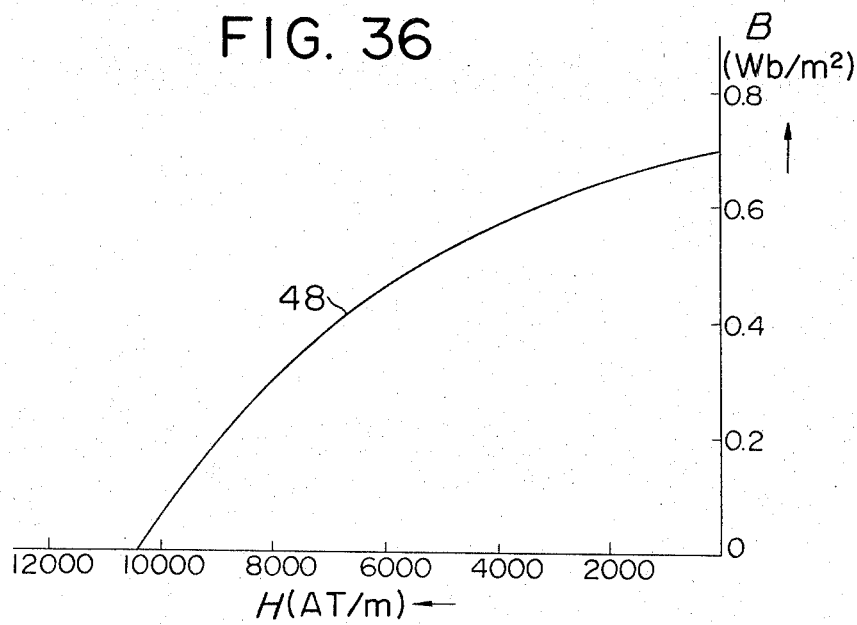
Figure 37:
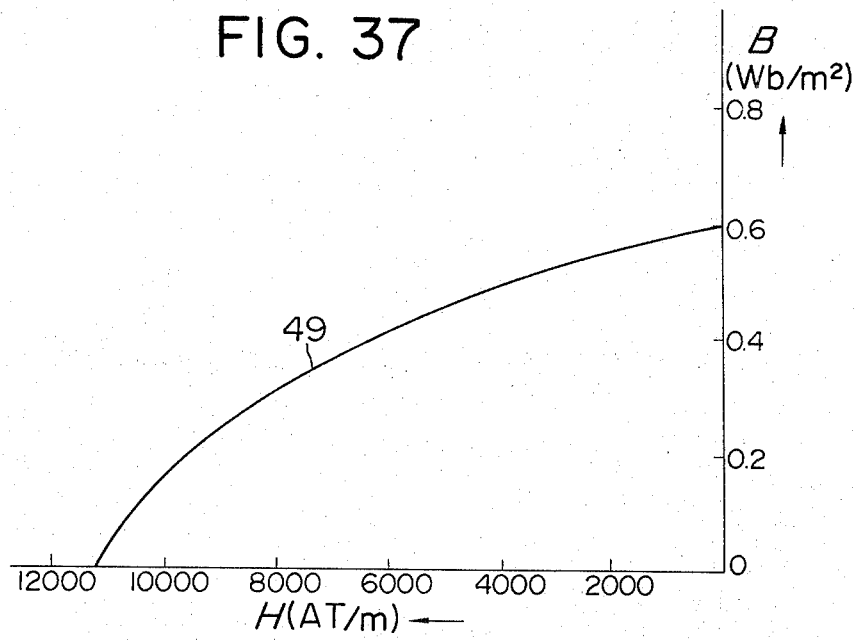

FIG. 35 indicates the magnetic characteristics obtained after heat-treatment of an alloy containing respectively 2% of Cr and Co (Example 47), FIG. 36 indicates the magnetic characteristics obtained after heat-treatment of an alloy containing 1% of Ni and 3% of V (Example 48), and FIG. 37 indicates the magnetic characteristics obtained after heat-treatment of an alloy containing 2% of Co, 1% of Ni, and 3% of V (Example 49).

The alloys of this invention can be produced in accordance with the use of ordinary processes. Accordingly, each of the component elements is mixed in a desired proportion, and is melted in air, vacuum or inert gas. In this case, the metals easily lost by vaporization (for example, Mn, Ti, etc.) should preferably be added later. After the addition of all the components, the alloys are kept for a suitable time (for example, 2–7 minutes) and then they are moulded into the desired shape such as a ring shape by pouring them into a suitable mould, such as a metal mould, sand mould, or shell mould. In the case of moulded products, an additional homogenization treatment (i.e., solution treatment) is preferably carried out at a temperature of 1,100 to 1,200° C. for 1–2 hours because the inside structure of the sample and the structure between the samples are not sufficiently homogeneous after the melting and moulding for the reason that the cooling rate in the mould is not the same. The alloys of the present invention produced by the above described process have hardnesses of 250 to 300 Hv.

The properties of an alloy of this invention becomes better, the faster the quenching takes place. This is based on the formation of a supersaturated solid solution.

When the quenching speed of the moulded products is slow, it is preferable that they are kept once at a temperature of 1100 to 1300° C. for approximately 15 min. to 2 hours, and then cooled in water, as a solution treatment.

The moulded products obtained by these processes are, if necessary, worked by tools such as a lathe. The alloys of this invention are easily worked by tools.

Moreover, heat-treatment of the alloys is carried out in order to impart more preferable magnetic properties thereto. The heat-treatment is carried out by a plurality of repeated cycles heating and cooling processes at a temperature below the Curie temperature. Nuclei for phase-transition are produced, for example, by tempering the alloys at a temperature of 350 to 420° C. for several hours. Then, the nuclei produced by this process are grown by annealing the alloys at a temperature of 550° C. to 600° C. for 1 to 2 hours, and non-magnetic $\gamma$ phases are dispersed homogeneously in ferro magnetic $\alpha$ phases. Whereby the necessary properties are obtained.

The final hardnesses are 400 to 500 Hv. and are determined by the added elements.

Figure 32:
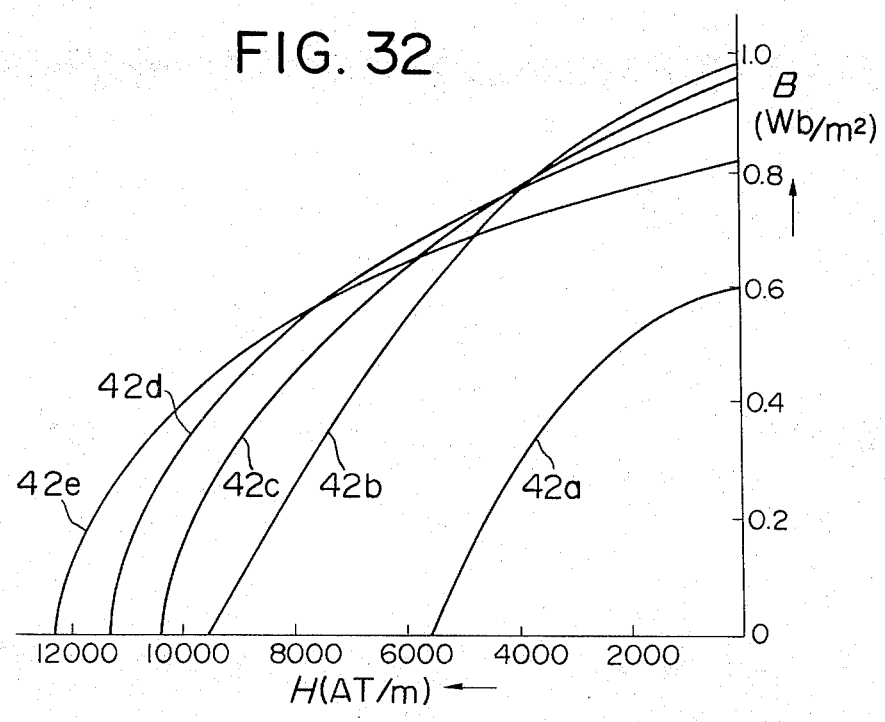

In the case of plate materials, bar materials, or wire materials, hot forging or swaging thereof are carried out at about 1100° C. in order to homogenize the structure thereof. The possible rate of cold working is 70–80%, and the alloys are worked into the shape of the final products generally through the processes of several cycles of solution treatment, acid washing, and cold working. The conditions of the heat-treatment are decided by the density of the Mn in the molten state, and the magnetic properties required. When the duration of the heat-treatment is longer, the $H_c$ value is increased, but, on the contrary, the $B_r$ value is decreased. (cf. FIG. 32, Example 42.)

When the heat-treatment is carried out at a relatively low temperature, for example, below 400° C., especially the $B_r$ value is increased, and when the heat-treatment is carried out at a temperature above 400° C., the $B_r$ value is decreased and the $H_c$ value is increased. Accordingly, the $B_r$ value can be maintained as high as required without a decrease thereof, when the heat-treatment is carried out at a temperature below 400° C., for relatively long times, for example, more than five hours.

Figure 24:
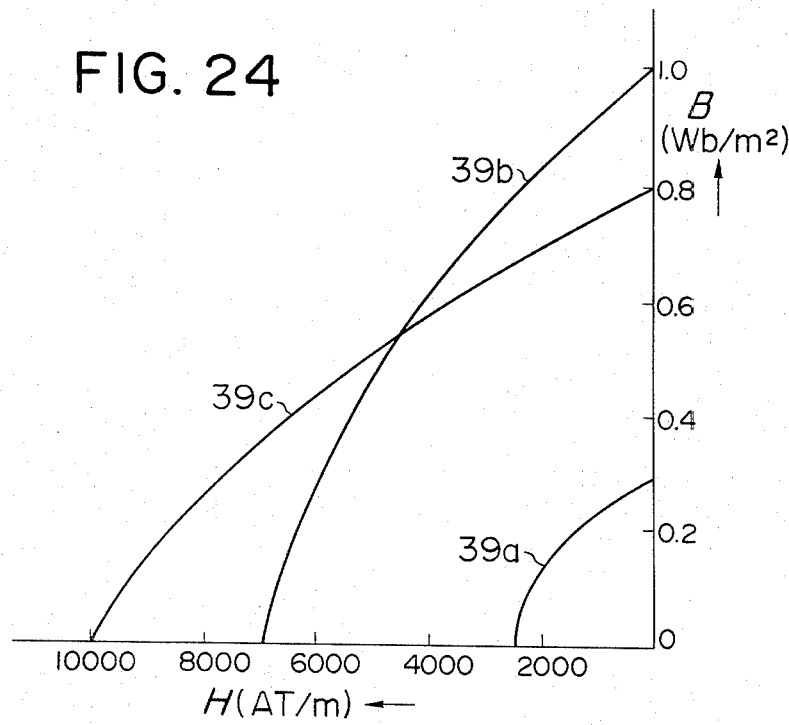

FIG. 24 indicates the magnetic characteristics of an alloy containing 11.5% of Mn (Example 39), in which these magnetic characteristics were that obtained before heat-treatment of the alloy (curve $a$), that obtained by the heating thereof at 400° C. for 5 hours (curve $b$), and that obtained by the cooling thereof below 100° C. and the subsequent heating thereof at 550° C. for 1 hour (curve $c$). The speed of the temperature rise in each case was 200° C./hour, and the cooling was carried out by leaving in air.

It can be understood that the greater improvement of the magnetic characteristics is accomplished by carrying out further heating and cooling.

Figure 25:
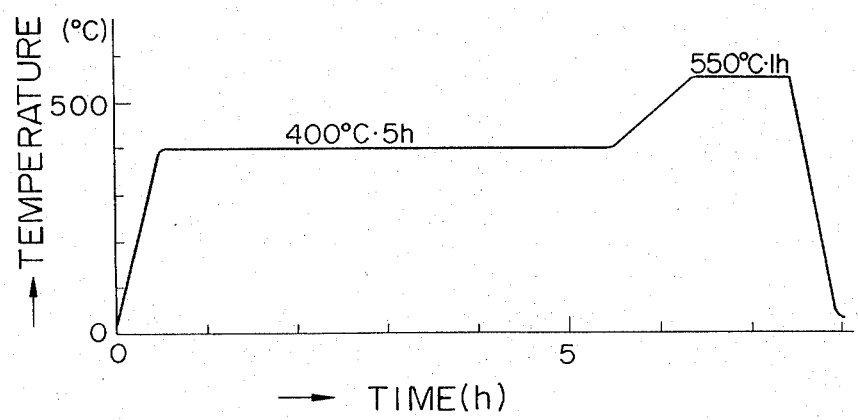
FIGS. 25 and 26 are graphical representations showing representative patterns of heat treatment carried out in accordance with the invention.
Figure 26:
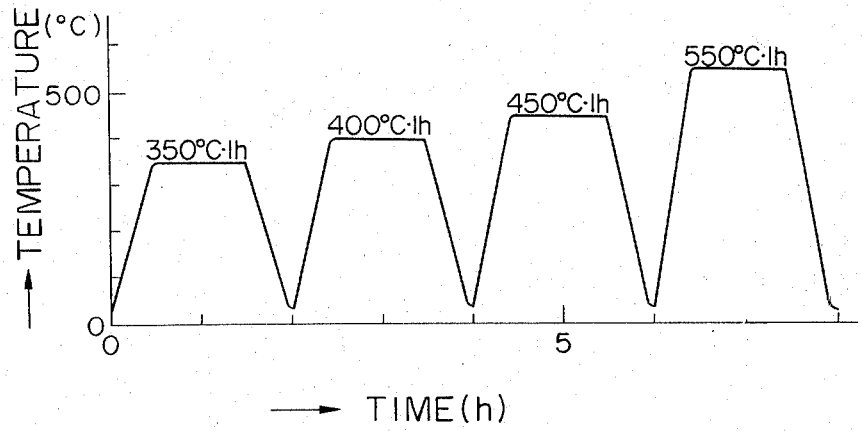

FIGS. 25 and 26 indicate patterns of representative heat-treatment processes.

According to one example of the treatment process of this invention, the alloy is subjected to a heat-treatment consisting of the first heating step of heating at 400° C. for 5 hours and the second heating steps of heating at 550° C. for 1 hour, as shown in FIG. 25. According to another example of the treatment process of this invention, the alloy is subjected to a heat-treatment consisting of the first heating step of heating at 350° C. for 1 hour, the second heating step of heating at 400° C. for 1 hour, the third heating step of heating at 450° C. for 1 hour, the fourth heating step of heating at 550° C. for 1 hour, and cooling steps of cooling down below 100° C. between every heating step. The most important point of these heat treatment processes resides in that the heating temperature of the latter step is maintained higher than the earlier step.

In the case where all process steps are carried out at the same heat-treatment temperature, an extremely long time is required to obtain the required magnetic properties, particularly the $H_c$ value, whereby the entire process is not practical. Further, when the heat-treatment is carried out with the latter step at a temperature lower than the temperature of the preceding step, the $H_c$ value cannot be increased.

It is more preferable that the cooling operation be carried out between each of the heating steps as shown in FIG. 26, in order to improve the magnetic properties, especially the $B_r$ value. This is based on the reason that the $B_r$ value is increased every time the alloy is subjected to a temperature fall-down passing through the point of 120 to 130° C. from higher temperature to lower.

Figure 27:
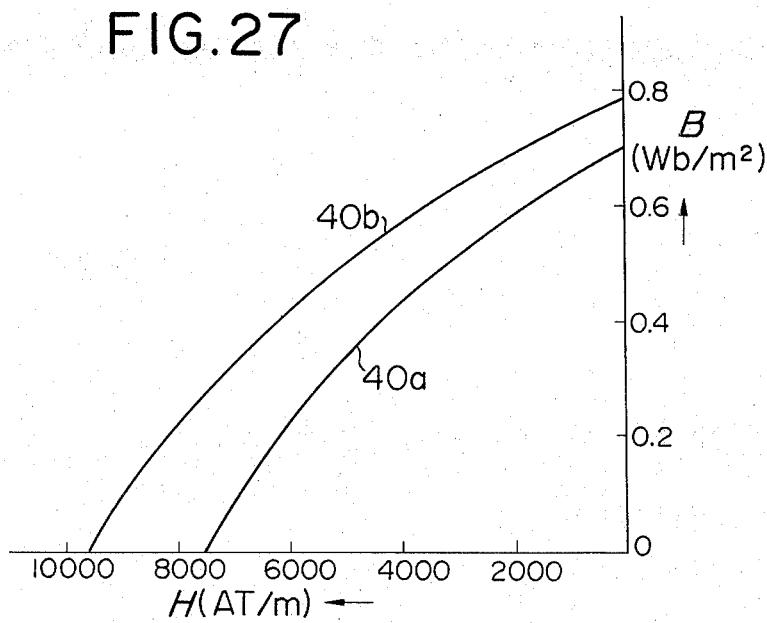

FIG. 27 indicates the differences in magnetic characteristics due to differences in the heat-treatment patterns. In this figure, curve "$a$" indicates the magnetic characteristic obtained by the stepped heat-treatment (cf. FIG. 25), and "$b$" indicates that obtained by saw-tooth pattern heat-treatment (cf. FIG. 26).

It is indicated in the FIG. 27 that when the heat-treatments of alloys containing the same component are carried out at the same temperature for the same times, the $H_c$ and $B_r$ values obtained by carrying out the heat-treatment including one cooling operation between the steps are both higher. The temperature of latter process step of heat-treatment becomes higher, the $B_r$ value becomes lower and the $H_c$ values becomes higher.

The sample after heat-treatment is introduced into a die casting mould after measurement of the characteristic thereof, and is die cast. Zinc or aluminum alloy is used as the die cast alloy which covers the semi-hard magnetic alloy of this invention. In the case of plates, bars or wires, heat-treatments thereof carried out after pressing or machining.

As mentioned above, semi-hard magnetic materials produced by this invention have the following advantages.

(1) The necessary magnetic properties are obtained only by moulding and heat-treating without cold working. Accordingly, when applied, the size or shape of the materials are not limited, and mass-productivity thereof is higher.

(2) The magnetic properties can be freely controlled by selecting several elements to be added and also can be varied by heat-treatment. Accordingly, the properties between lots can be kept constant, and application field thereof is broad because the available range of magnetic properties obtained is broad.

(3) Cut working, cold working, and the working into the shapes of plates, wires, or bars are possible. Accordingly, the cost of the materials and the working are reduced by the reason that various shapes are easily obtained and grinding thereof is not required.

(4) Expensive material such as Ni or Co is used little. Accordingly, the cost of raw materials is low, the supply of raw materials is easy, and the possibility of cost-down in the future is bright.

The following Table 5 indicates the results obtained by the comparison of the alloys of this invention with semi-hard magnetic materials used in the past.

TABLE 5

| Name | Components | $H_c$ | $B_r$ | Advantage | Disadvantage |
|---|---|---|---|---|---|
| Al-Ni-Co alloy | Al, 9–11%<br>Ni, 15–17%<br>Co, 3%<br>Fe remainder | 8,000<br>–16,000 | 0.9<br>–1.0 | Both of $B_r$, $H_c$ are high<br>do<br>do<br>do | The cost of the material is high; plastic working is impossible. Cutting is difficult. |
| Co steel | Co, 20%<br>Cr, 2.5%<br>C, 0.8%<br>W, 8% | 12,000<br>–16,000 | 0.95 | Working is easy<br>do<br>do<br>do | The cost of the material is high. |
| Alloys of this invention. | Mn, 11–12%<br>Ti, 3%<br>Cu, 3%<br>Cr etc., several percent Fe remainder | 80<br>1,600 | 1.1<br>0.75 | | Specific gravity is slightly higher. |

Figure 28:
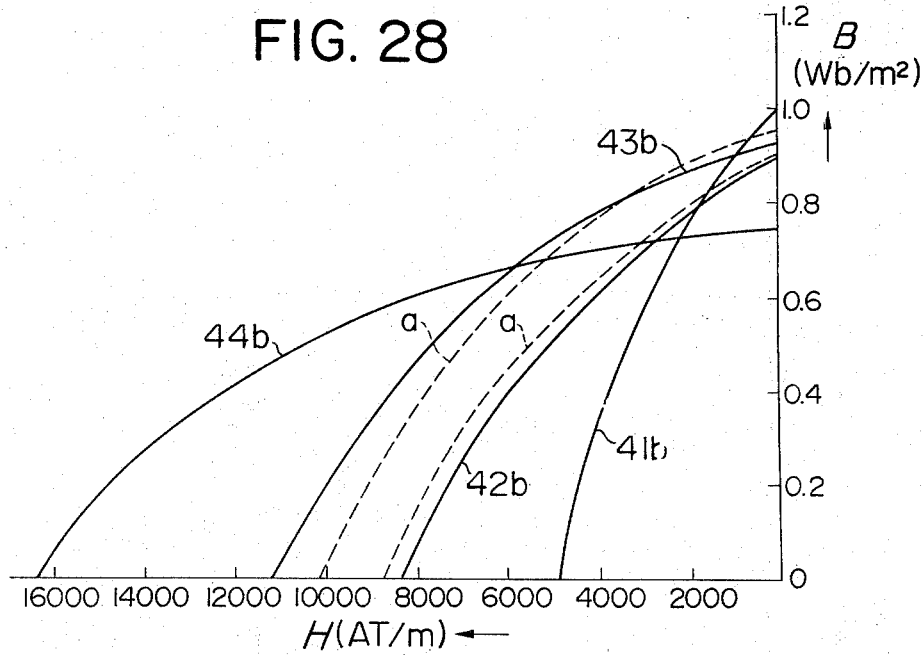

The characteristic of an alloy of this invention can be freely varied by the elements added. FIG. 28 indicates the comparison of characteristics of representative alloys of this invention with that of Alnico alloy now being used. In this figure, cure "$a$" indicates the magnetic characteristic of Alnico alloy shown in Table 5, and "$b$" indicates the magnetic characteristic of the alloy produced by the procedure of Examples 41 to 44 of this invention. The characteristic of the Alnico alloy was measured on the magnetic material in a motor purchased on the market. The resistivity of the alloy of this invention is approximately 80% of that of the Alnico alloy, and the temperature coefficient of the magnetic flux density is slightly larger. However, this value is much smaller than the temperature coefficient of carbon steel, and the variation with the passage of time is also small.

Figure 29:
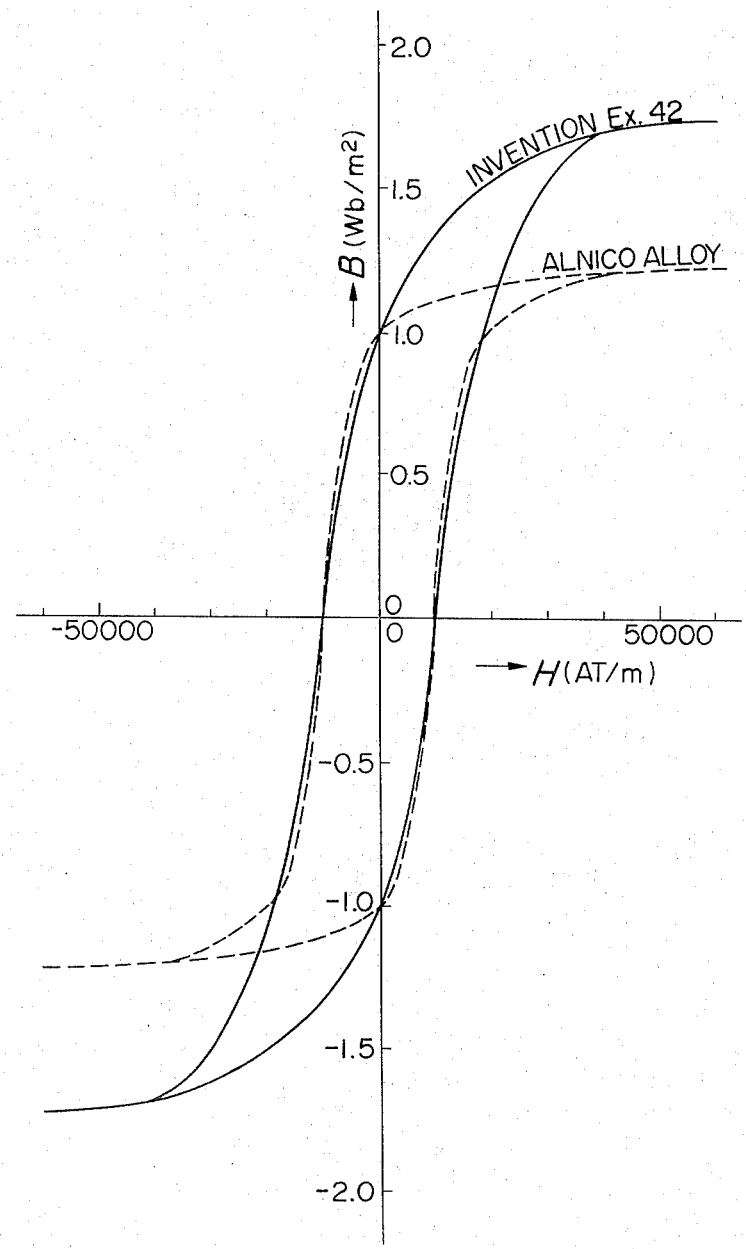

FIG. 29 indicates all hysteresis loops of an alloy of this invention (Example 42) corresponding to the Alnico alloy used in the hysteresis motors for the outer-rotor.

As is obvious from FIGS. 28 and 29, it was found that the alloy of this invention shows, when it is used in hysteresis motors, almost the same properties as the Alnico alloy.

The alloys of this invention have possibilities of applications to hysteresis motors used in sound equipment, tape recorders, stereos etc., memory wires used in electron computers etc., and reed switches used in electronic exchangers etc., in consideration of the magnetic properties thereof.

The features when the alloy is used in hysteresis synchronized motors, are described below. The types of hysteresis motors are divided into the inner rotor-type and the outer-rotor type by the construction of the rotors thereof. The coercive force of the magnetic steel used in the inner-rotor type motor is greater than that of the outer-rotor type. When these two types are used in sound equipment, the outer-rotor type hysteresis motor is better than the inner-rotor type motor with respect to wow or flutter, rotation irregularity, and efficiency but is slightly inferior with respect to magnetic shield and mechanical construction such as bearings.

The cut working of Alnico alloy is difficult, so that dimensional precision thereof has been achieved mainly by grinding. Accordingly, for applying the alloy to the magnets in outer-rotor type hysteresis motors, internal grinding must be carried out and the cost thereof is high, so that the products of inner-rotor type hysteresis motors is remarkably more in number.

Recently, however, as a high level of tone quality is required in sound equipment, demand for outer-rotor type motors have become high because of wow or flutter.

The alloy of this invention has good advantages for these demands because machining thereof on lathes is possible, and high residual magnetization is possible within the range of the coercive force required in outer-rotor type hysteresis motors.

The elements of Cr, Co, Ni, V, Si, etc., are indicated as the elements to be added, and magnetization curve, Curie temperature, resistivity, cutting, formability and the metal flow property in moulding, etc., can be varied broadly by the kind of the elements added.

Figure 30:
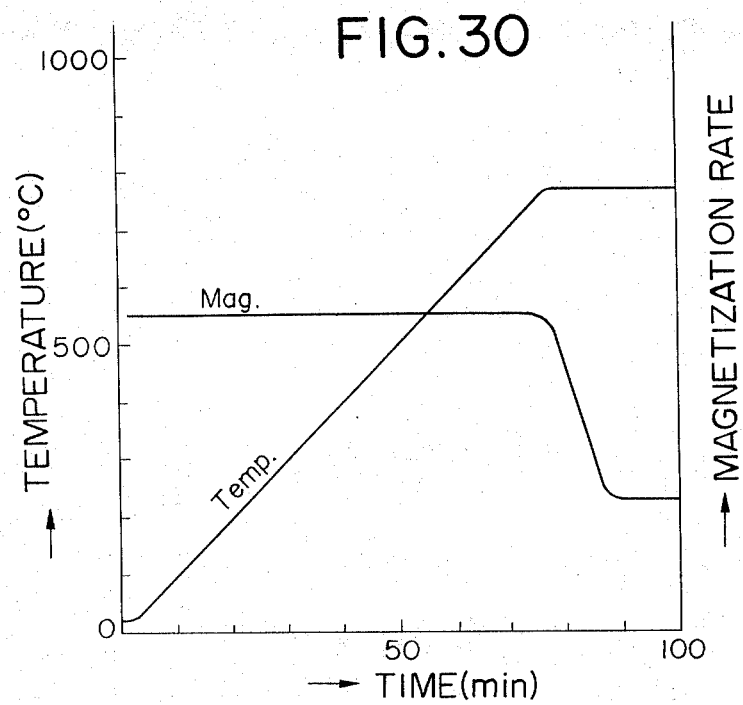
FIGS. 30 and 31 are graphical representations indicating temperature characteristics of magnetization rate of alloys produced in accordance with the invention.
Figure 31:
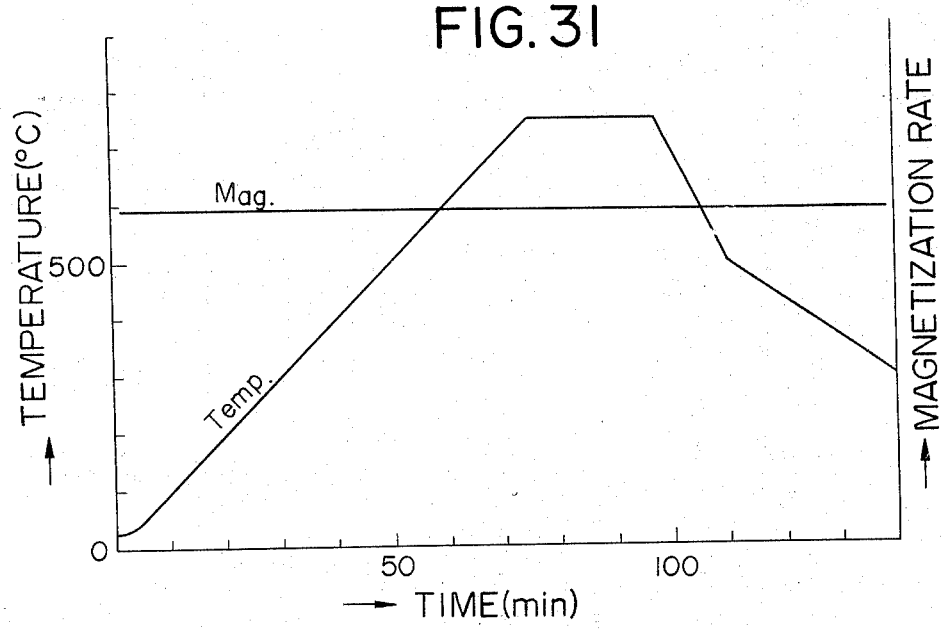

FIGS. 30 and 31 include the temperature curve of magnetization rate no unit, only for relative comparison of an alloy containing Cr, and Co (cf. Examples 42 and 43) as a representative example.

The following Table 6 indicates a comparison between the physical characteristics of an alloy of this invention and Alnico alloy.

TABLE 6

|  | All alloys of this invention | Alnico alloy |
|---|---|---|
| Resistivity (×10⁻⁸ ohm m.) | 40–50 | 60 |
| Temperature coefficient of resistivity (° C.⁻¹) | 1.39×10⁻³ |  |
| Hardness $H_v$ | 350–500 | 620 |
| Specific gravity | 7.6–7.7 | 7.2 |
| Temperature coefficient of magnetic flux density (° C.⁻¹) | 3×10⁻⁴ | 2×10⁻ |

Coefficient of magnetic flux density is an average of a magnet of dimension ratio of 4.4 to 1 at −190° C. to 90° C.

Figure 33A:
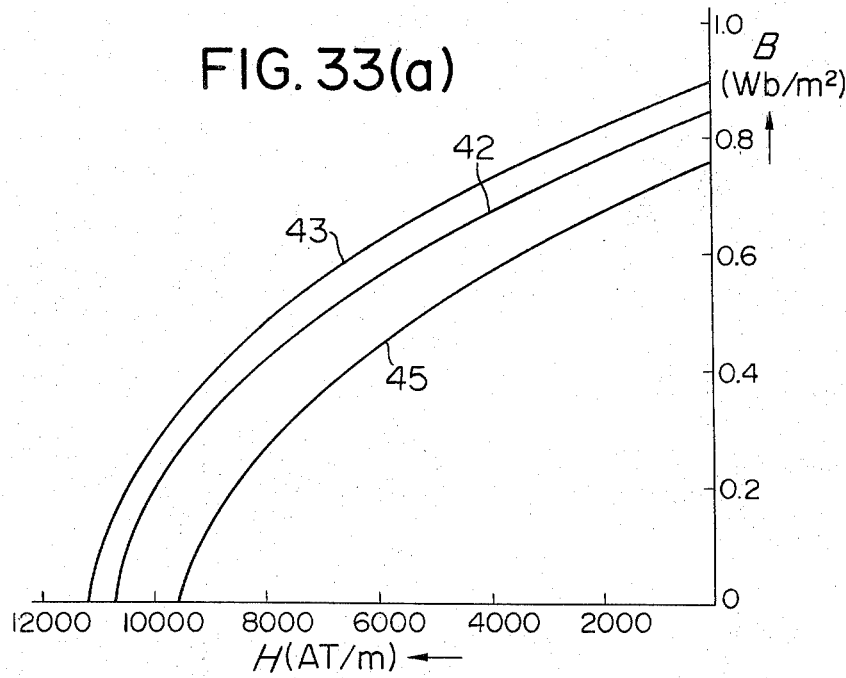
FIGS. 33(b), 33(c) and 33(d) are graphical representations indicating characteristics of motors utilizing these alloys.
Figure 33B:
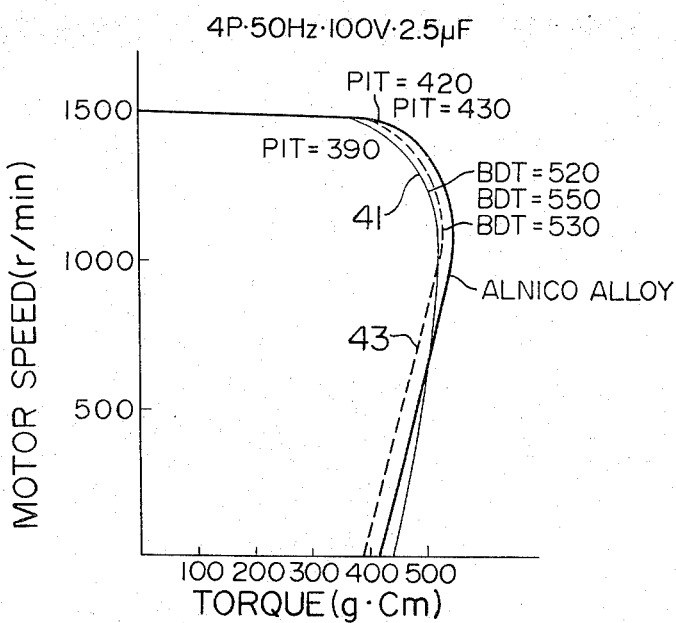
Figure 33C:
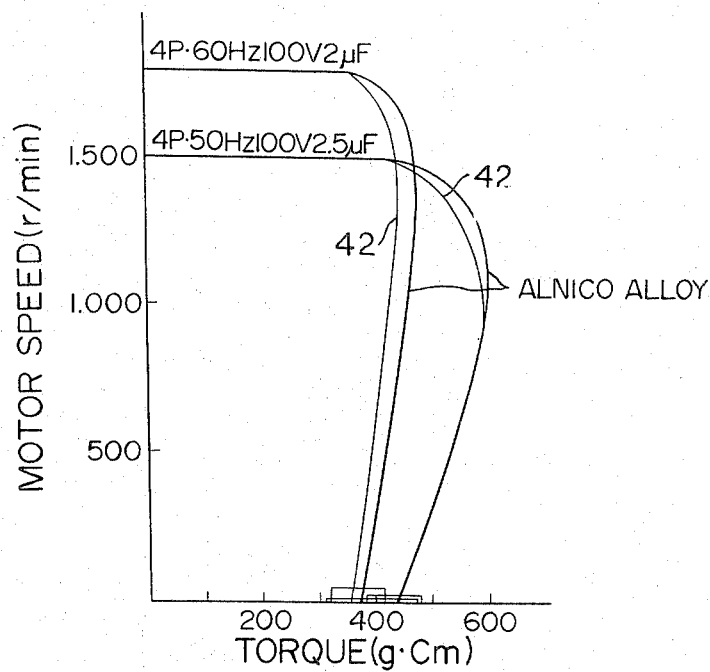
Figure 33D:
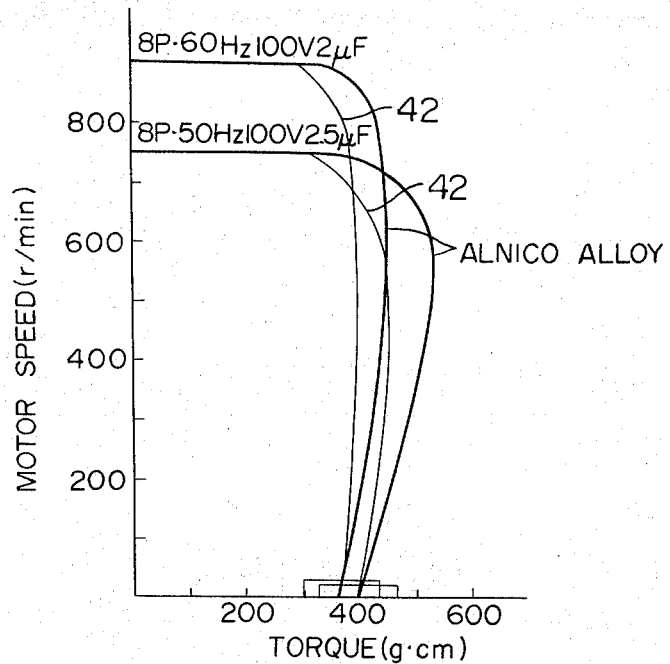

FIG. 33(a) indicates the magnetic characteristic of an alloy of this invention (Examples 42, 43, 45), and FIGS. 33(b) and 33(d) indicate torque-motor speed curves of an inner-rotor type hysteresis motor on the marked in which alloys of this invention (Examples 41–43) are used in place of its rotor.

Synchronous pull-in torque is less than that of Alnico alloy. The reason for this is considered to be that the characteristic of rectangular hysteresis loop in the second quadrant of the magnetization curve is slightly inferior.

Figure 34A:
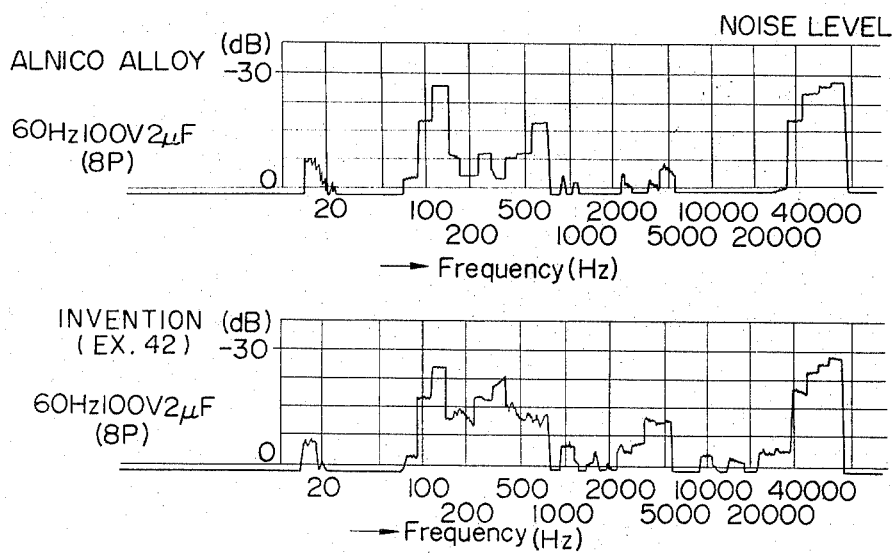
FIGS. 34(a) and 34(b) are graphical representations indicating noise levels of motors utilizing these alloys.
Figure 34B:
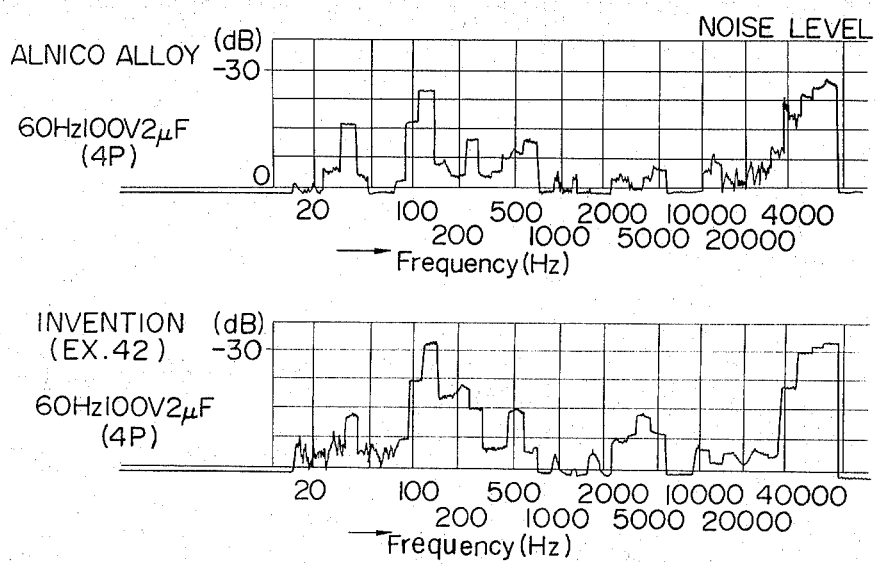

FIGS. 34(a) and 34(b) indicate a comparison between noise levels of an alloy of this invention and of an Alnico alloy known heretofor. It is considered that the alloy of this invention shows a higher noise level. The reason for this is that the test was carried out on the alloy in the state of a casting, that is of a die casting. Higher harmonic noises and beats thereof are deemed almost the same.

As stated above, the alloys of this invention can compete with ample advantage with Alnico alloys and forging cobalt steels on the point of magnetic and other properties, and, moreoever, are remarkably advantageous in that the starting materials thereof are readily available and inexpensive, Mn, Cu, Ti being used as principal materials.

What is claimed is:

1. A method of producing semi-hard magnetic materials which comprises solution treating an alloy consisting essentially of from 5% to 15% of manganese, from 0.2% to 5% of copper, from 0.4% to 7% of titanium, and a remainder of iron, followed by a plurality of alternate heating and cooling steps, each of said heating steps being at a temperature of from about 350° C. to about 620° C. for a period of time of from about 0.5 hour to about 10 hours, the heating temperature in each of said steps being higher than the heating temperature of the preceding step, each of said cooling steps being at least about 120° C. below the preceding heating step, all percentages being by weight.

2. A method of producing semi-hard magnetic materials which comprises solution treating an alloy consisting essentially of from 5% to 15% of manganese, from 0.2% to 5% of copper, from 0.4% to 7% of titanium, at least one member selected from the group consisting of from 0.1% to 8% of chromium, from 0.1% to 50% of cobalt, from 0.1% to 3% of nickel, from 0.1% to 6% of vanadium, and a remainder of iron, followed by a plurality of alternate heating and cooling steps, each of said heating steps being at a temperature of from about 350° C. to about 620° C. for a period of time of from about 0.5 hour to about 10 hours, the heating temperature in each of said steps being higher than the heating temperature of the preceding step, each of said cooling steps being at least about 120° C. below the preceding heating step, all percentages being by weight.

3. A method of producing semi-hard magnetic materials which comprises solution treating an alloy consisting essentially of from 5% to 15% of manganese, from 0.2% to 5% of copper, from 0.4% to 7% of titanium at least one member selected from the group consisting of from 0.1% to 2.5% of silicon, from 0.1% to 3.0% of germanium, from 0.1% to 2.0%, each, of tin, zirconium, niobium, boron, tellurium, tungsten, sulphur, lead, molybdenum, aluminum, and phosphorus, and a remainder of iron, followed by a plurality of alternate heating and cooling steps, each of said heating steps being at a temperature of from about 350° C. to about 620° C. for a period of time of from 0.5 hour to about 10 hours, the heating temperature in each of said steps being higher than the heating temperature of the preceding step, each of said cooling steps being at least about 120° C. below the preceding heating step, all percentages being by weight.

4. A method of producing semi-hard magnetic materials which comprises solution treating an alloy consisting essentially of from 5% to 15% of manganese, from 0.2% to 5% of copper, from 0.4% to 7% of titanium, at least one of from 0.1% to 8% of chromium, from 0.1% to 50% of cobalt, from 0.1% to 3% of nickel, and from 0.1% to 6% of vanadium, at least one of from 0.1% to 2.5% of silicon, from 0.1% to 3.0% of germanium, from 0.1% to 2.0%, each, of tin, zirconium, niobium, boron, tellurium, tungsten, sulphur, lead, molybdenum, aluminum, and phosphorus, and remainder of iron, followed by a plurality of alternate heating and cooling steps, each of said heating steps being at a temperature of from about 350° C. to about 620° C. for a period of time of from 0.5 hour to about 10 hours, the heat temperature in each of said steps being higher than the heating temperature of the preceding step, each of said cooling steps being at least about 120° C. below the preceding heating step, all percentages being by weight.

5. A method of producing semi-hard magnetic materials which comprises solution treating an alloy consisting essentially of from 5% to 15% of manganese, from 0.2% to 5% of copper, from 0.4% to 7% of titanium, at least one member selected from the group consisting of up to 3% Sc, up to 6% V, up to 8% Cr, up to 8% Co, up to 3% Ni, and up to 2% Zn, and a remainder of iron, followed by a plurality of alternate heating and cooling steps, each of said heating steps being at a temperature of from about 350° C. to about 620° C. for a period of time of from 0.5 hour to about 10 hours, the heating temperature in each of the said steps being higher than the heating temperature of the preceding step, each of said cooling steps being at least about 120° C. below the preceding heating step, all percentages being by weight.

6. A method of producing semi-hard magnetic materials which comprises solution treating an alloy consisting essentially of from 5% to 15% of manganese, from 0.2% to 5% of copper, from 0.4% to 7% of titanium, at least one member selected from the group consisting of up to 3% Sc, up to 6% V, up to 8% Cr, up to 8% Co, up to 3% Ni, and up to 2% Zn, at least one member selected from the group consisting of from 0.1% to 2.5% of silicon, from 0.1% to 3.0% of germanium, from 0.1% to 2.0%, each, of tin, zirconium, niobium, boron, tellurium, tungsten, sulphur, lead, molybdenum, aluminum, and phosphorus, and a remainder of iron, followed by a plurality of alternate heating and cooling steps, each of said heating steps being at a temperature of from about 350° C. to about 620° C. for a period of time of from 0.5 hour to about 10 hours, the heating temperature in each of said steps being higher than the heating temperature of the proceding step, each of said cooling steps being at least about 120° C. below the preceding heating step, all percentages being by weight.

7. A method of producing semi-hard magnetic materials according to claim 1, wherein the cooling temperature in each of said cooling steps is below 100° C.

8. A method of producing semi-hard magnetic materials according to claim 2, wherein the cooling temperature in each of said cooling steps is below 100° C.

9. A method of producing semi-hard magnetic materials according to claim 3, wherein the cooling temperature in each of said cooling steps is below 100° C.

10. A method of producing semi-hard magnetic materials according to claim 4, wherein the cooling temperature in each of said cooling steps is below 100° C.

11. A method of producing semi-hard magnetic materials according to claim 5, wherein the cooling temperature in each of said cooling steps is below 100° C.

12. A method of producing semi-hard magnetic materials according to claim 6, wherein the cooling temperature in each of said cooling steps is below 100° C.

References Cited
UNITED STATES PATENTS

| | | | |
|---|---|---|---|
| 2,167,188 | 7/1939 | Schaarwächter et al. | 148—102 |
| 3,166,408 | 1/1965 | Chen | 75—126 B |
| 436,497 | 1890 | Hadfield et al. | 75—126 B |
| 2,129,347 | 9/1938 | Golyer | 75—123 N |
| 2,382,651 | 8/1945 | Nesbitt | 75—126 B |

L. DEWAYNE RUTLEDGE, Primary Examiner

W. R. SATTERFIELD, Assistant Examiner

U.S. Cl. X.R.

148—120; 75—123 N, 123 M, 126 B